United States Patent
Matsuo et al.

(10) Patent No.: US 11,721,078 B2
(45) Date of Patent: Aug. 8, 2023

(54) INFORMATION PROCESSING SYSTEM, INFORMATION PROCESSING TERMINAL DEVICE, SERVER DEVICE, INFORMATION PROCESSING METHOD AND PROGRAM THEREOF

(71) Applicant: NIPPON TELEGRAPH AND TELEPHONE CORPORATION, Tokyo (JP)

(72) Inventors: Kazuya Matsuo, Musashino (JP); Koya Mori, Musashino (JP); Hiroyuki Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 10 days.

(21) Appl. No.: 17/603,551

(22) PCT Filed: Apr. 2, 2020

(86) PCT No.: PCT/JP2020/015127
§ 371 (c)(1),
(2) Date: Oct. 13, 2021

(87) PCT Pub. No.: WO2020/213405
PCT Pub. Date: Oct. 22, 2020

(65) Prior Publication Data
US 2022/0189127 A1 Jun. 16, 2022

(30) Foreign Application Priority Data
Apr. 16, 2019 (JP) .................................. 2019-077799

(51) Int. Cl.
*G06T 19/00* (2011.01)

(52) U.S. Cl.
CPC ...... *G06T 19/006* (2013.01); *G06T 2219/024* (2013.01)

(58) Field of Classification Search
CPC ... G06T 19/006; G06T 2219/024; G06F 3/01; G06F 3/0481; G09G 5/00; G09G 5/377; G09G 5/38; H04L 65/612
See application file for complete search history.

(56) References Cited

U.S. PATENT DOCUMENTS

| 8,502,835 B1 * | 8/2013 | Meehan ................. G06F 16/58 345/633 |
| 10,803,669 B1 * | 10/2020 | Roche ................. G06F 3/04815 |

(Continued)

OTHER PUBLICATIONS

Microsoft Corporation, Microsoft HoloLens, literature, Feb. 21, 2019 (Reading Day), https://www.microsoft.com/ja-jp/hololens.

(Continued)

*Primary Examiner* — Motilewa Good-Johnson
(74) *Attorney, Agent, or Firm* — Harness, Dickey & Pierce, P.L.C.

(57) ABSTRACT

A technology for reducing a processing delay when a plurality of mixed reality spaces are shared between terminals is provided.
An information processing system includes a terminal configured to display an image representing a mixed reality space obtained by superimposing a virtual space in a real space, and a server apparatus configured to communicate with the terminal. The server apparatus manages, for each of a plurality of real spaces, information for identifying the real space and anchor information for defining a superimposition position of the virtual space in the real space and, in a case where an acquisition request for anchor information corresponding to a first real space is received from the terminal, (Continued)

transmits response information including anchor information corresponding to the first real space and anchor information corresponding to a second real space adjacent to the first real space to the terminal. The terminal stores the response information received from the server apparatus and, in a case where the terminal is placed into the second real space, displays an image representing a mixed reality space based on anchor information corresponding to the second real space.

10 Claims, 23 Drawing Sheets

(56) References Cited

U.S. PATENT DOCUMENTS

| | | | | |
|---|---|---|---|---|
| 2014/0063065 | A1* | 3/2014 | Nishikawa | G06T 19/006 345/633 |
| 2017/0270713 | A1* | 9/2017 | Dooley | G06F 3/011 |
| 2017/0287218 | A1* | 10/2017 | Nuernberger | G06F 3/04845 |
| 2018/0218538 | A1* | 8/2018 | Short | G06T 7/73 |
| 2020/0082633 | A1* | 3/2020 | Rom | G06T 17/10 |
| 2020/0279239 | A1* | 9/2020 | Ramamurthy | G06F 21/31 |

OTHER PUBLICATIONS

Tarik Taleb et al., PERMIT: Network slicing for personalized 5G mobile telecommunications, IEEE Communications Magazine, vol. 55, No. 5, 2017, pp. 88-93.

Federico Debandi et al., Enhancing cultural tourism by a mixed reality application for outdoor navigation and information browsing using immersive devices, IOP Conference Series: Materials Science and Engineering, vol. 364, 2018.

Dina Bass and Mark Gurman, How Microsoft Jumped on Apple's Laptop Stumbles, Bloomberg, May 3, 2017, https://www.bloomberg.com/news/features/2017-05-03/microsoft:gets-hardware-religion.

Microsoft Corporation, Design your space in an environment with Dynamics 365 layout, Microsoft Dynamics 365, Feb. 21, 2019 (Reading Day), https://dynamics.microsoft.com/ja-jp/mixed-reality/layout/.

Microsoft Corporation, Resolve issues faster in the context of Dynamics 365 Remote Assist, Microsoft Dynamics 365, Feb. 21, 2019 (Reading Day), https://dynamics.microsoft.com/ja-jp/mixed-reality/remote-assist/.

NEXTSCAPE Inc., Japan's first! Microsoft HoloLens adopted for condominium sales, literature, May 23, 2017, https://www.nextscape.net/news/2017/05/20170523.

Join GitHub today, Microsoft / MixedRealityToolkit, Feb. 26, 2019 (Reading Day), https://github.com/Microsoft/MixedRealityToolkit/tree/c562ff958cd10ea0448id846f7b2bb261e8f551.

Jakob Nielsen, Response Times: The 3 Important Limits, Nielsen Norman Group, Jan. 1, 1993, https://www.nngroup.com/articles/response-times-3-important-limits/.

* cited by examiner

INFORMATION PROCESSING SYSTEM, INFORMATION PROCESSING TERMINAL DEVICE, SERVER DEVICE, INFORMATION PROCESSING METHOD AND PROGRAM THEREOF

CROSS-REFERENCE TO RELATED APPLICATIONS

This application is a 371 U.S. National Phase of International Application No. PCT/JP2020/015127 filed on Apr. 2, 2020, which claims priority to Japanese Application No. 2019-077799 filed on Apr. 16, 2019. The entire disclosures of the above applications are incorporated herein by reference.

TECHNICAL FIELD

One aspect of the present disclosure relates to an information processing system for information processing used for constructing a mixed reality (MR) space, an information processing terminal and a server used in this system, and an information processing method and a program.

BACKGROUND ART

In recent years, advances in augmented reality (AR)/virtual reality (VR) technologies have drawn attention to mixed reality (MR) that combines those technologies. MR refers to a technology for constructing a space in which a virtual space and a real space are mixed (hereinafter, referred to as a "mixed reality space"), by projecting virtual information onto the real space. A market size of MR has increased over years.

HoloLens (registered trade mark) of Microsoft is known (for example, refer to Non-Patent Literature 1) as a representative device implementing MR. In HoloLens, a sensor for acquiring information representing the real space as 3D information is mounted, and the virtual space and the real space are mixed by mapping the virtual information to a 3D model of the real space generated based on the information acquired by the sensor. Projecting the mixed reality space constructed in such a manner onto a hologram lens of a transmission type allows a user to experience the mixed reality space.

In addition, attention has been drawn to MR terminals including HoloLens as a next-generation mobile terminal replacing a smartphone (for example, refer to Non-Patent Literatures 2, 3, and 4). Thus, in the future, the MR terminals are considered to be used not only as in the above example but also more generally in various locations regardless of indoor or outdoor spaces.

As application examples of MR, "simulation of a layout by projecting a 3D model to an indoor space" that ends with personal application (for example, refer to Non-Patent Literature 5), "presentation of an instruction from an operator to a field of view of a field worker as virtual information in the construction industry or the manufacturing industry" (for example, refer to Non Patent Literature 6), "presentation of an appearance of a building after completion at a scheduled construction site of the building to a field of view of a customer as a 3D object" (for example, refer to Non-Patent Literature 7), and the like are suggested.

Thus, attention has drawn to MR as a technology for sharing the virtual information in the real space in a cooperative work or decision-making among a plurality of people.

Based on such a background, Microsoft has proposed "collaborative computing". Collaborative computing is a computing model for projecting information viewed by each individual person through a PC to the real space and sharing the information among a plurality of persons while allowing the persons to interact with the information as if touching a real object. In a case where this computing model penetrates, the real space will be a location in which information is viewed or shared, instead of a display of a PC or a smartphone. Thus, the technology for sharing the mixed reality space among the plurality of persons in MR is considered to become more important.

Microsoft provides a space sharing service (hereinafter, referred to as a "sharing service") that can simply implement sharing of the mixed reality space (for example, refer to Non Patent Literature 8). In this sharing service, information (anchor information) for fixing a virtual object in the mixed reality space is shared between MR terminals through a server. Each MR terminal receiving the anchor information displays the virtual object at a relative position with respect to coordinates calculated based on the anchor information. Thus, each MR terminal can display the virtual object at the same position in the real space, and this enables a plurality of users to view the same mixed reality space.

In addition, in a server program, information related to the mixed reality space to be shared is managed as a "room", and the anchor information is stored in the room. In the program, sharing of the mixed reality space is implemented by transmitting the anchor information to MR terminals linked to the same room.

CITATION LIST

Non Patent Literature

NonPatent Literature 1: Internet <URL: https://www.microsoft.com/ja-jp/hololens>
NonPatent Literature 2: Taleb, Tarik, et al. "PERMIT: Network Slicing for Personalized 5G mobile Telecommunications," IEEE Communications Magazine, 55 (5), pp. 88-93, 2017.
NonPatent Literature 3: Debandi, Federico, et al. "Enhancing Cultural Tourism by a Mixed Reality Application for Outdoor Navigation and Information Browsing Using Immersive Devices," IOP Conference Series: Materials Science and Engineering, 364 (1), pp. 12-48, 2018.
NonPatent Literature 4: Internet <URL: https://www.bloomberg.com/news/features/2017-05-03/microsoft-gets-hardware-religion>
NonPatent Literature 5: Internet <URL: https://dynamics.microsoft.com/j a-jp/mixed-reality/layout/>
NonPatent Literature 6: Internet <URL: https://dynamics.microsoft.com/ja-jp/mixed-reality/remote-assist/>
NonPatent Literature 7: Internet <URL: https://www.nextscape.net/news/2017/05/20170523>
NonPatent Literature 8: Internet <URL: https://github.com/Microsoft/MixedRealityToolkit/tree/c562ff9582cd10ea0448fd846f7b2bb261e8f551>
NonPatent Literature 9: Internet (URL: https://www.nngroup.com/articles/response-times-3-important-limits/>

SUMMARY OF THE INVENTION

Technical Problem

Even in a system of the related art, the mixed reality space can be shared between different MR terminals in a state where the server program is started on a machine that can communicate with the MR terminals. One example of processing of sharing the mixed reality space between the MR terminals in the related art will be described. Hereinafter, the machine on which the server program operates will be referred to as the "server".

First, one example of processing on a client (MR terminal) side according to the system of the related art will be described.

In a state where the server program is started on the server which can communicate with the MR terminals, the MR terminal connected to the server, for verifying whether a room of a space desired to be shared is already present, transmits a name of the room to the server. In a case where the room is not present in the server, the MR terminal requests the server to create the room on the server. Then, the MR terminal uploads the anchor information calculated on the MR terminal to the room.

Meanwhile, in a case where the room is found in the server, the MR terminal requests the anchor information of the room from the server and downloads the anchor information.

Then, the MR terminal attaches the downloaded anchor information to the mixed reality space recognized by the MR terminal. Thus, MR terminals that are placed into the same room can acquire the same anchor information and consequently, enable users of the MR terminals to experience the same mixed reality space. In addition, the anchor information that is acquired once can be locally stored. Thus, in a case of visiting a target mixed reality space at the second time or later, the mixed reality space can be shared without downloading the anchor information.

Next, one example of processing on the server side according to the system of the related art will be described.

In a case where the server receives a verification message including the name of the room from the MR terminal, the server verifies presence or absence of the room and responds to the MR terminal. At this point, in a case where the room is present, the server links the room to the MR terminal that is a transmission source of the verification message. Hereinafter, this processing will be represented as "placing the MR terminal into the room". In a case where the room is not present, a room creation request is transmitted from the MR terminal as described above. Thus, the server creates the requested room in response to reception of the room creation request.

Then, the server stores the anchor information received from the MR terminal by linking the anchor information to the created room. Then, in a case where the server receives a request for the anchor information from another MR terminal that is placed in the same room, the server transmits the anchor information to the MR terminal.

Thus, even in the system of the related art, one mixed reality space can be shared among a plurality of persons. However, in a case where the MR terminals including HoloLens are widely used like smartphones, desires to share the mixed reality space in various locations regardless of indoor or outdoor spaces are considered to increase. In the technology of the related art that does not assume such a situation, the following objects are present for implementing sharing of a plurality of mixed reality spaces.

(Object 1) In the technology of the related art, the presence of the room desired to be shared is verified using a room name. Thus, the MR terminal needs to have all room names to be visited by the MR terminal in advance.

(Object 2) Exiting of the MR terminal that is placed in a certain room (for example, a room A) from the mixed reality space of the room A cannot be detected.

(Object 3) A space in which the MR terminal is currently positioned among the plurality of mixed reality spaces cannot be determined. Thus, even in a case where Objects 1 and 2 are solved, a room name that is to be inquired to the server cannot be determined.

(Object 4) Even in a case where Objects 1 to 3 are solved, the anchor information has to be acquired again from the server at each placement into a new room, and a delay that causes the user to feel unpleasant may occur before sharing starts (for example, refer to Non-Patent Literature 9). For example, by validation experiment, occurrence of a delay of ten and a few seconds is measured in a case of acquiring the anchor information from a personal computer (PC) installed near the MR terminal by user datagram protocol (UDP) communication, or a case of operating a sharing service on the machine at a data center in a city and acquiring the anchor information in the same manner from the city by TCP communication using a mobile network.

For solving those objects, a technology that enables switching of the mixed reality space, that is, the room, of a sharing target and enables high-speed sharing of the plurality of mixed reality spaces in accordance with movement of the MR terminal in the real space is necessary.

The present disclosure is conceived in view of the above matter, and an object of the present disclosure is to provide a technology for reducing a delay in information processing that occurs when a plurality of mixed reality spaces are shared among a plurality of terminals.

Means for Solving the Problem

For solving the above object, a first aspect of the present disclosure is an information processing system including an information processing terminal configured to acquire spatial information representing a real space and display an image representing a mixed reality space obtained by superimposing a virtual space in the real space, and a server apparatus configured to communicate with the information processing terminal. The server apparatus includes a mixed space management unit configured to, for each of a plurality of real spaces, create and manage mixed space management information in which information for identifying the real space, anchor information for defining a superimposition position of the virtual space in the real space, and anchor information corresponding to an adjacent real space are associated, and a response unit configured to, in a case where an acquisition request for anchor information corresponding to a first real space among the plurality of real spaces is received from the information processing terminal, transmit response information including first anchor information corresponding to the first real space and second anchor information corresponding to a second real space adjacent to the first real space to the information processing terminal of a request source based on mixed space management information corresponding to the first real space. The information processing terminal includes a response information acquisition unit configured to, in a case where the information processing terminal is placed into the first real space among the plurality of real spaces, acquire the response information from the server apparatus by transmitting the acquisition request for the anchor information to the server apparatus, and a mixed space information generation unit configured to store the acquired response information in a storage medium and, in a case where the information processing terminal is placed into the second real space, generate information representing a mixed reality space obtained by superimposing the virtual space in the second real space based on the second anchor information included in the response information stored in the storage medium.

A second aspect of the present disclosure is the information processing system in which the information for identifying the real space includes the spatial information representing the real space and acquired by the information processing terminal, and the mixed space management information further includes terminal state information that is estimated based on the spatial information received from the information processing terminal, and that represents a real space in which the information processing terminal is positioned.

A third aspect of the present disclosure is the information processing system in which the server apparatus further includes an adjacency relationship estimation unit configured to estimate an adjacency relationship related to the plurality of real spaces based on the terminal state information and the spatial information newly received from the information processing terminal, and output an estimation result to the mixed space management unit.

A fourth aspect of the present disclosure is a server apparatus including a processor configured to communicate with an information processing terminal configured to acquire spatial information representing a real space and display an image representing a mixed reality space obtained by superimposing a virtual space in the real space, and a memory connected to the processor. The memory includes a storage unit configured to, for each of a plurality of real spaces, store mixed space management information in which information for identifying the real space, anchor information for defining a superimposition position of the virtual space in the real space, and anchor information corresponding to an adjacent real space are associated. The processor is configured to, in a case where an acquisition request for anchor information corresponding to a first real space among the plurality of real spaces is received from the information processing terminal, transmit response information including first anchor information corresponding to the first real space and second anchor information corresponding to a second real space adjacent to the first real space to the information processing terminal of a request source based on mixed space management information corresponding to the first real space.

A fifth aspect of the present disclosure is an information processing terminal including a processor configured to communicate with a server apparatus configured to manage anchor information defining a superimposition position for constructing a mixed reality space obtained by superimposing a virtual space in a real space, a memory connected to the processor, and a display unit configured to display an image representing the mixed reality space constructed based on the anchor information. The processor is configured to acquire spatial information representing the first real space, in a case where the information processing terminal is placed into a first real space among a plurality of real spaces, request the anchor information by transmitting the acquired spatial information to the server apparatus, store first anchor information corresponding to the first real space and second anchor information corresponding to a second real space adjacent to the first real space in the memory based on a response received from the server apparatus in response to a request for the anchor information, and generate information representing a mixed reality space obtained by superimposing the virtual space in the second real space based on the second anchor information stored in the memory and display the information on the display unit, in a case where the information processing terminal is placed into the second real space.

Effects of the Invention

According to the first and fourth aspects of the present disclosure, in a case where the acquisition request for the anchor information corresponding to the first real space is received from the information processing terminal, the server apparatus managing the anchor information transmits, in response to the acquisition request, the response including the anchor information corresponding to the first real space and the anchor information corresponding to the second real space adjacent to the first real space to the information processing terminal. The information processing terminal receiving the response can acquire and store the anchor information corresponding to the first real space and the anchor information corresponding to the second real space adjacent to the first real space, before the information processing terminal is placed into the second real space.

In such a manner, as the anchor information necessary for sharing the mixed reality space, the information processing terminal can acquire and store, in advance, not only the anchor information corresponding to the real space in which the information processing terminal is currently placed, but also the anchor information corresponding to another real space to which the information processing terminal may possibly subsequently move. Thus, when the information processing terminal moves to another real space, the information processing terminal can generate and display the image representing the mixed reality space based on the stored anchor information, and a processing delay in a case of sharing the mixed reality space can be significantly reduced, compared to a case of acquiring the necessary anchor information after moving to another real space.

According to the second aspect of the present disclosure, the server apparatus manages, as the information for identifying the real space, the spatial information representing the real space and acquired by the information processing terminal in the mixed space management information managed by the mixed space management unit, and furthermore, manages the terminal state information representing the estimation result of the real space in which the information processing terminal is positioned, based on the spatial information received from the information processing terminal.

In such a manner, the server apparatus manages the spatial information received from the information processing terminal and the mixed space management information including the anchor information, by associating the spatial information with the mixed space management information. Thus, the server apparatus can easily respond to the request for the anchor information from the information processing terminal based on the spatial information included in the request. In addition, the server apparatus manages the estimation result of the real space in which the information processing terminal is positioned. Thus, in response to the request from the information processing terminal, the server apparatus can transmit appropriate information in which a positional relationship is considered. By inquiring to the server apparatus based on the acquired spatial information, the information processing terminal can verify the real space in which the information processing terminal is positioned, and whether it is necessary to acquire new anchor information, and the mixed reality space can be smoothly shared.

According to the third aspect of the present disclosure, the server apparatus estimates the adjacency relationship between the real spaces based on the managed terminal state information and the spatial information newly received from the information processing terminal, and outputs the estimation result to the mixed space management unit managing the anchor information. Thus, the server apparatus can estimate the adjacency relationship between the real spaces and appropriately manage the anchor information without requiring a complicated operation such as registration of the adjacency relationship between the real spaces in advance in the server apparatus. In addition, the information processing terminal can store only the anchor information having the adjacency relationship by appropriately inquiring to the server apparatus. This can save the storage and reduce a communication amount while implementing high-speed sharing of the mixed reality space.

According to the fifth aspect of the present disclosure, when the information processing terminal capable of communicating with the server apparatus managing the anchor information is placed into the first real space, the information processing terminal acquires the spatial information representing the first real space and requests the anchor information from the server apparatus by transmitting the spatial information to the server apparatus. The information processing terminal stores the anchor information corresponding to the first real space and the anchor information corresponding to the second real space adjacent to the first real space in the memory based on the response obtained from the server apparatus in response to the request. Thus, when the information processing terminal is placed into the second real space, the information processing terminal can generate and display the information representing the mixed reality space by using the anchor information corresponding to the second real space and stored in advance. Thus, a delay required for processing can be eliminated, compared to a case of acquiring the necessary anchor information from the server apparatus after the information processing terminal is placed into the second real space, and high-speed sharing of the mixed reality space can be implemented.

That is, according to each aspect of the present disclosure, a technology for reducing a delay in information processing that occurs when a plurality of mixed reality spaces are shared among a plurality of terminals can be provided.

DESCRIPTION OF EMBODIMENTS

Hereinafter, an embodiment of the present disclosure will be described in detail with reference to the drawings.

Embodiment (1) Configuration (1-1) System

Figure 1:
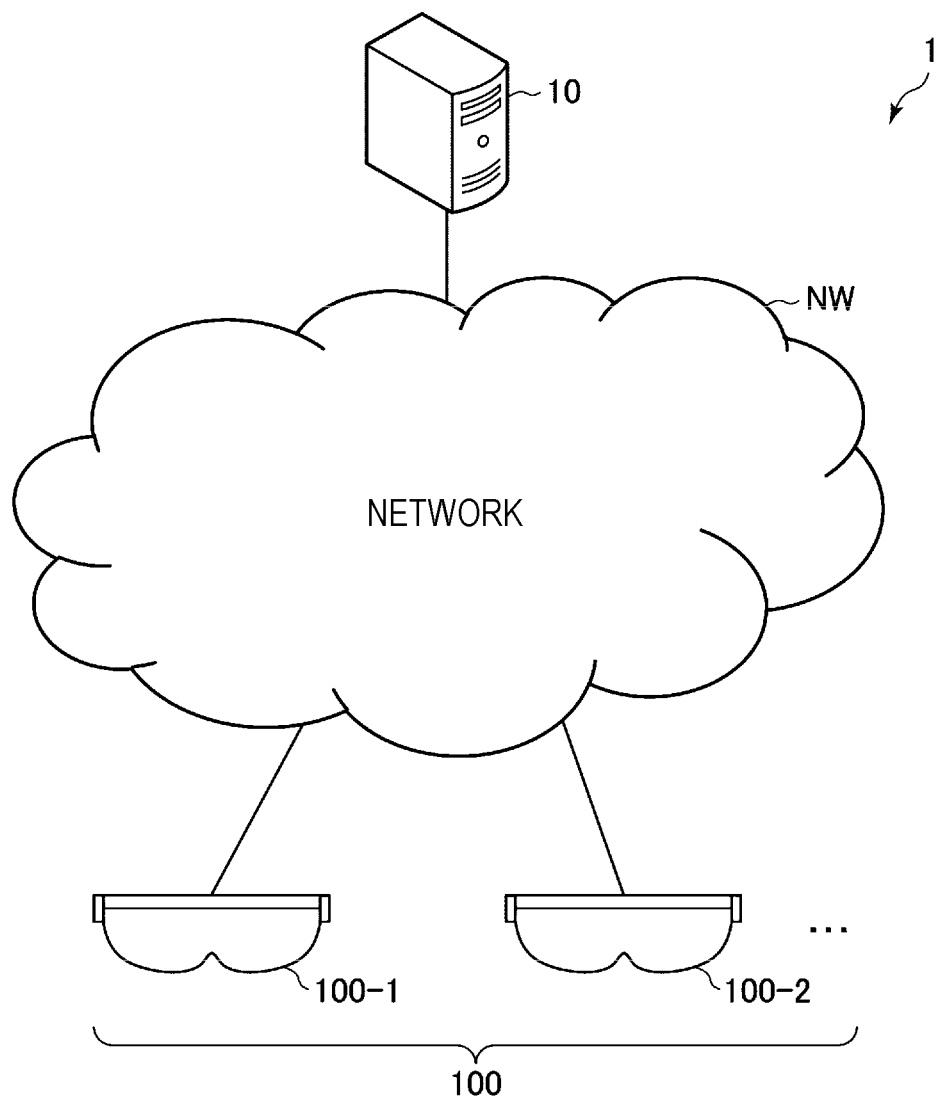
FIG. 1 is a diagram illustrating an overall configuration of an information processing system according to one embodiment of the present disclosure.

FIG. 1 is a diagram illustrating one example of an overall configuration of an information processing system according to one embodiment of the present disclosure.

This system includes a server 10 as a server apparatus and mixed reality (MR) terminals 100-1, 100-2, . . . (hereinafter, collectively referred to as an "MR terminal 100") as an information processing terminal that can communicate with each other through a network NW.

For example, the network NW is configured with a relay network and a plurality of access networks for accessing the relay network. As the relay network, a general public network such as the Internet, or a closed network that is controlled to be accessible from, for example, only limited devices is used. As the access networks, for example, a wireless local area network (LAN), a mobile phone network, a wired phone network, fiber to the home (FTTH), and a cable television (CATV) network are used.

The MR terminal 100 acquires spatial information representing a real space as 3D information and causes a user to experience a mixed reality space constructed based on the acquired 3D information. The MR terminal 100 is an information processing terminal of a head-mounted display type such as HoloLens of Microsoft.

The server 10 communicates with the MR terminal 100 and generates and manages information for sharing the mixed reality space among a plurality of the MR terminals 100. The server 10 is a server computer that is operated and managed by an operator developing/providing, for example, a game or an application.

The server 10 shares the mixed reality space among the plurality of MR terminals 100 by sharing information of an "anchor" ("anchor information") that is used for fixing a virtual object in the mixed reality space. The server 10 manages the anchor information together with the 3D information of the real space acquired by the MR terminal, as a "room" representing the mixed reality space corresponding to each real space.

(1-2) MR Terminal (1-2-1) Hardware Configuration

Figure 2:
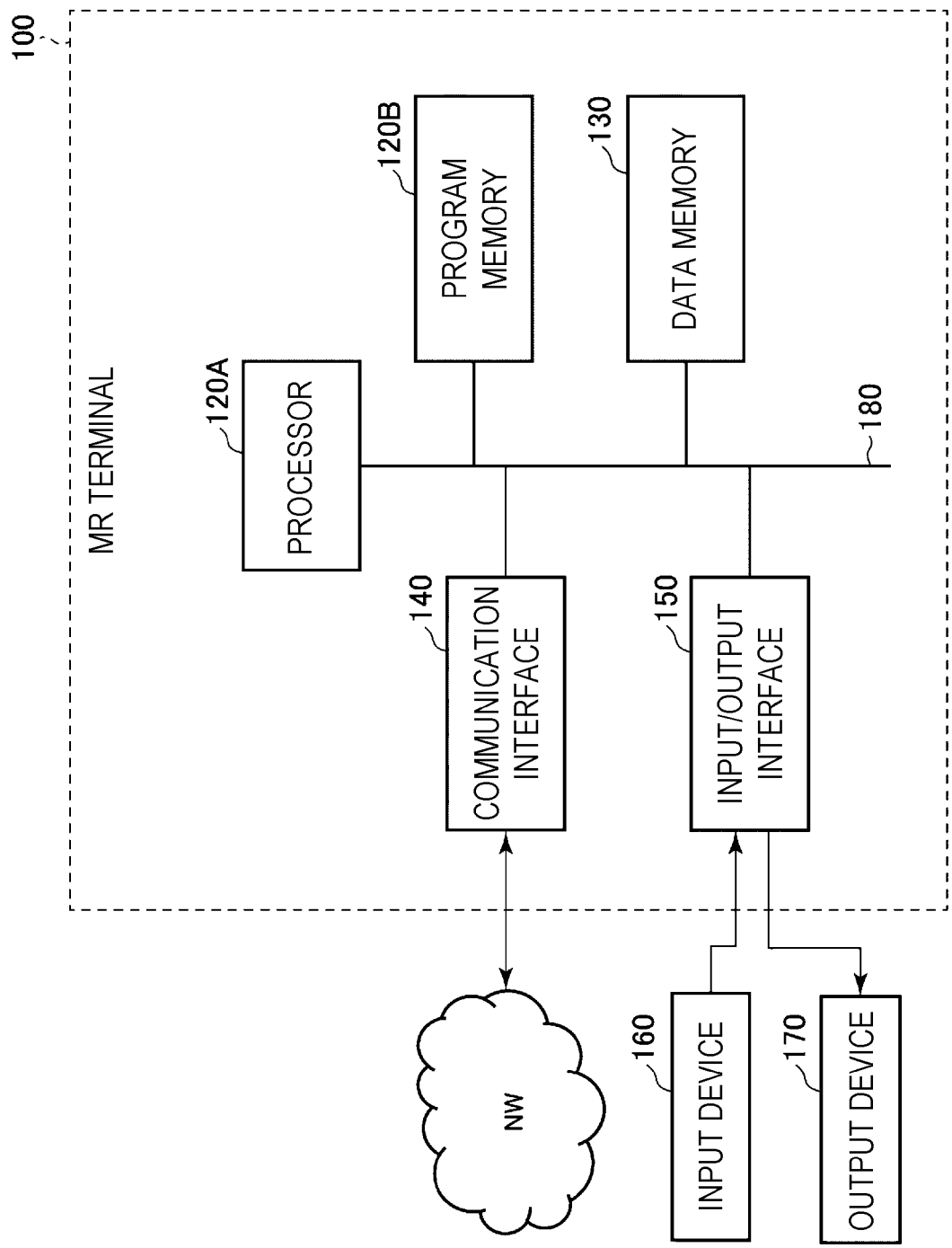
FIG. 2 is a block diagram illustrating a hardware configuration of an MR terminal as an information processing terminal according to one embodiment of the present disclosure.

FIG. 2 is a block diagram illustrating a hardware configuration of the MR terminal 100 as the information processing terminal according to one embodiment of the present disclosure.

The MR terminal 100 includes a hardware processor 120A in which hardware processors such as a central processing unit (CPU), a GPU, and a holographic processor are combined. A program memory 120B, a data memory 130, a communication interface 140, and an input/output interface 150 are connected to the hardware processor 120A through a bus 180.

The communication interface 140 includes, for example, one or more wired or wireless communication interface units and transfers data to the server 10 in accordance with a communication protocol defined by the network NW. For example, a wired LAN is used as a wired interface. An interface such as a wireless LAN or Bluetooth (registered trade mark) that employs a low-power wireless data communication standard is used as a wireless interface.

An input device 160 and an output device 170 that are attached to the MR terminal 100 are connected to the input/output interface 150. For example, the input/output interface 150 performs processing of fetching operation data input by the user of the MR terminal 100 through the input device 160 and the 3D information that is measured through a sensor and represents the real space, and outputting output data created by the hardware processor 120A to the output device 170.

For example, the input device 160 is a sensor, a touch panel, a touchpad, a microphone, a keyboard, or a mouse. The sensor may include, for example, an acceleration sensor, a depth sensor, a gyroscope, a magnetic sensor, an infrared sensor, and a camera.

The output device 170 is, for example, a liquid crystal or organic electro luminescence (EL) display of a transmission type displaying an image that is generated by the hardware processor 120A and represents the mixed reality space including a menu screen, a GUI, and an object. In addition, the output device 170 can include a speaker that outputs voice information generated by the hardware processor 120A.

Devices incorporated in the MR terminal 100 may be used as the input device 160 and the output device 170. Alternatively, an input device and an output device of another information terminal such as a smartphone with which the MR terminal 100 can communicate through a network may be used.

In the program memory 120B, a combination of a non-volatile memory such as a hard disk drive (HDD) or a solid state drive (SSD) that is writable and readable at any time, and a non-volatile memory such as a ROM is used as a storage medium. The program memory 120B stores a program necessary for executing various types of control processing according to one embodiment.

In the data memory 130, a combination of a non-volatile memory such as an HDD or an SSD that is writable and readable at any time, and a volatile memory such as a random access memory (RAM) is used as a storage medium. The data memory 130 is used for storing various types of data that are acquired and created in a course of information processing.

(1-2-2) Software Configuration

Figure 3:
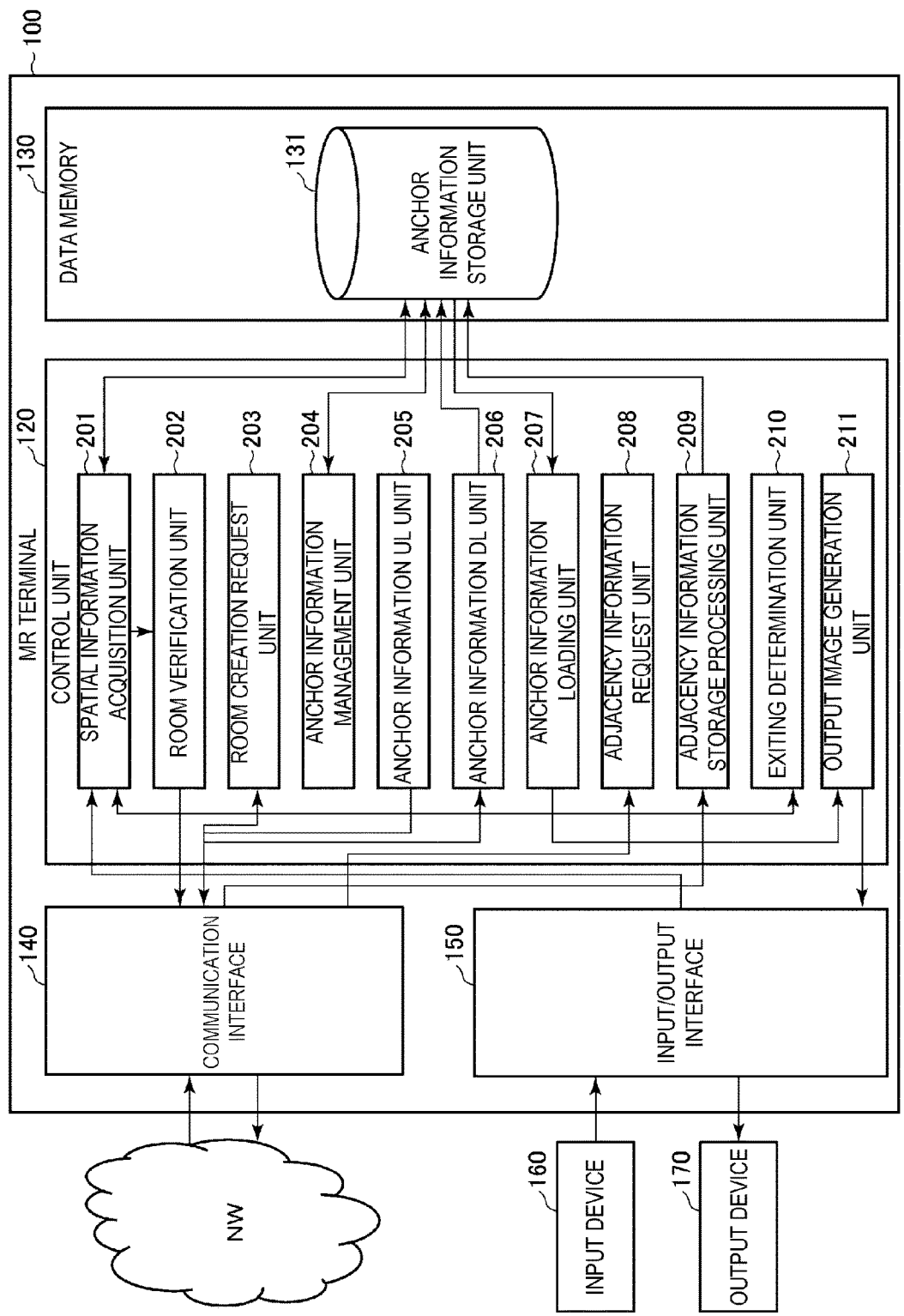
FIG. 3 is a block diagram illustrating a software configuration of the MR terminal as the information processing terminal according to one embodiment of the present disclosure.

FIG. 3 is a block diagram illustrating a software configuration of the MR terminal 100 according to one embodiment of the present disclosure in relation to the hardware configuration illustrated in FIG. 2.

An anchor information storage unit 131 is provided in a storage region of the data memory 130.

The anchor information storage unit 131 stores the anchor information for fixing the virtual object in the mixed reality space, by linking the anchor information to information for identifying the corresponding mixed reality space. The anchor information storage unit 131 does not always need to be incorporated in the MR terminal 100 and may be an external storage medium such as a USB memory.

A control unit 120 is configured with the hardware processor 120A and the program memory 120B and includes, as software processing function units, a spatial information acquisition unit 201, a room verification unit 202, a room creation request unit 203, an anchor information management unit 204, an anchor information upload (UL) unit 205, an anchor information download (DL) unit 206, an anchor information loading unit 207, an adjacency information request unit 208, an adjacency information storage processing unit 209, an exiting determination unit 210, and an output image generation unit 211. All of the processing function units are implemented by causing the hardware processor 120A to execute the program stored in the program memory 120B. Alternatively, the control unit 20 may be implemented in other diverse forms including an integrated circuit such as an application specific integrated circuit (ASIC) or a field-programmable gate array (FPGA).

The spatial information acquisition unit 201 performs processing of acquiring the 3D information measured as the spatial information representing the real space by the input device 160 such as the depth sensor or the camera through the input/output interface 150, and passing the 3D information to the room verification unit 202.

The room verification unit 202 performs processing of inquiring whether the "room" for storing information of the mixed reality space corresponding to the real space representing the 3D information is already generated, by transmitting the acquired 3D information to the server 10.

In a case where the room corresponding to the transmitted 3D information is determined as not being present, the room creation request unit 203 performs processing of requesting the server 10 to create the room.

The anchor information management unit 204 performs processing of managing the anchor information stored in the anchor information storage unit 131.

In a case where the room of the space desired to be shared is not found in the server 10, the anchor information upload (UL) unit 205 performs processing of computing the anchor information based on the acquired 3D information and uploading the anchor information to the server 10 for sharing.

In a case where the room of the space desired to be shared is found in the server 10, the anchor information download (DL) unit 206 performs processing of downloading the anchor information corresponding to the space from the server 10.

The anchor information loading unit 207 performs processing of attaching the anchor information to the recognized mixed reality space.

The adjacency information request unit 208 performs processing of requesting, from the server 10, information of another room that has an adjacency relationship with the room corresponding to the current space.

The adjacency information storage processing unit 209 performs processing of storing, in the anchor information storage unit 131, the information of the other room having the adjacency relationship with the room corresponding to the current space and received from the server 10.

The exiting determination unit 210 performs processing of determining whether a position of the MR terminal 100 is in a target space of the room. For example, the exiting determination unit 210 can determine whether the position of the MR terminal 100 is in the target space of the room, by acquiring the 3D information for each predetermined time period and requesting the server 10 to perform comparison by transmitting the 3D information to the server 10.

The output image generation unit 211 performs processing of generating the output data including information representing the constructed mixed reality space based on the anchor information attached to the mixed reality space by the anchor information loading unit 207, and passing the output data to the output device 170. For example, the output image generation unit 211 generates image data representing the mixed reality space in which the virtual object is arranged in an appropriate position and a direction based on coordinates calculated by using the anchor information, and displays the image data on the display as the output device 170. Detailed processing of construction of the mixed reality space such as generation of a spatial mesh based on the 3D information, computation and loading of the anchor information, and generation of the image data can use generally known technologies and thus, will not be described here in detail (for example, refer to Non Patent Literature 1).

(1-3) Server
(1-3-1) Hardware Configuration

Figure 4:
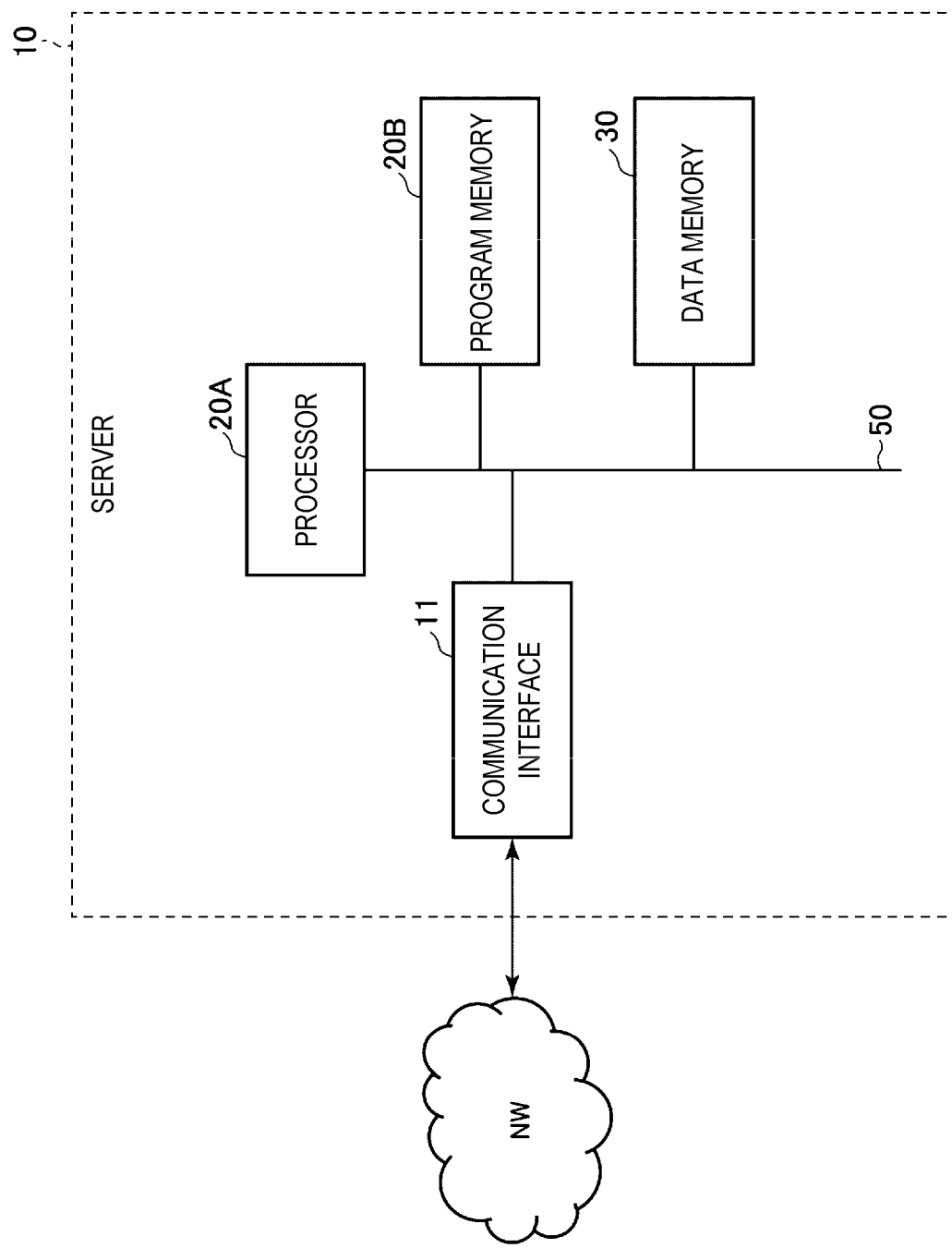
FIG. 4 is a block diagram illustrating a hardware configuration of a server apparatus according to one embodiment of the present disclosure.

FIG. 4 is a block diagram illustrating one example of a hardware configuration of the server 10 as the server apparatus according to one embodiment of the present disclosure.

The server 10 includes a hardware processor 20A such as a CPU. A program memory 20B, a data memory 30, and a communication interface 11 are connected to the hardware processor 20A through a bus 50.

The communication interface 11 includes, for example, one or more wired or wireless communication interface units and transfers data to the MR terminal 100 in accordance with the communication protocol defined by the network NW. For example, a wired LAN is used as a wired interface. An interface such as a wireless LAN or Bluetooth that employs a low-power wireless data communication standard is used as a wireless interface.

In the program memory 20B, a combination of a non-volatile memory such as an HDD or an SSD that is writable and readable at any time, and a non-volatile memory such as a ROM is used as a storage medium. The program memory 20B stores a program necessary for executing various types of control processing according to one embodiment.

In the data memory 30, a combination of a non-volatile memory such as an HDD or an SSD that is writable and readable at any time, and a volatile memory such as a RAM is used as a storage medium. The data memory 30 is used for storing various types of data that are acquired and created in a course of information processing.

(1-3-2) Software Configuration

Figure 5:
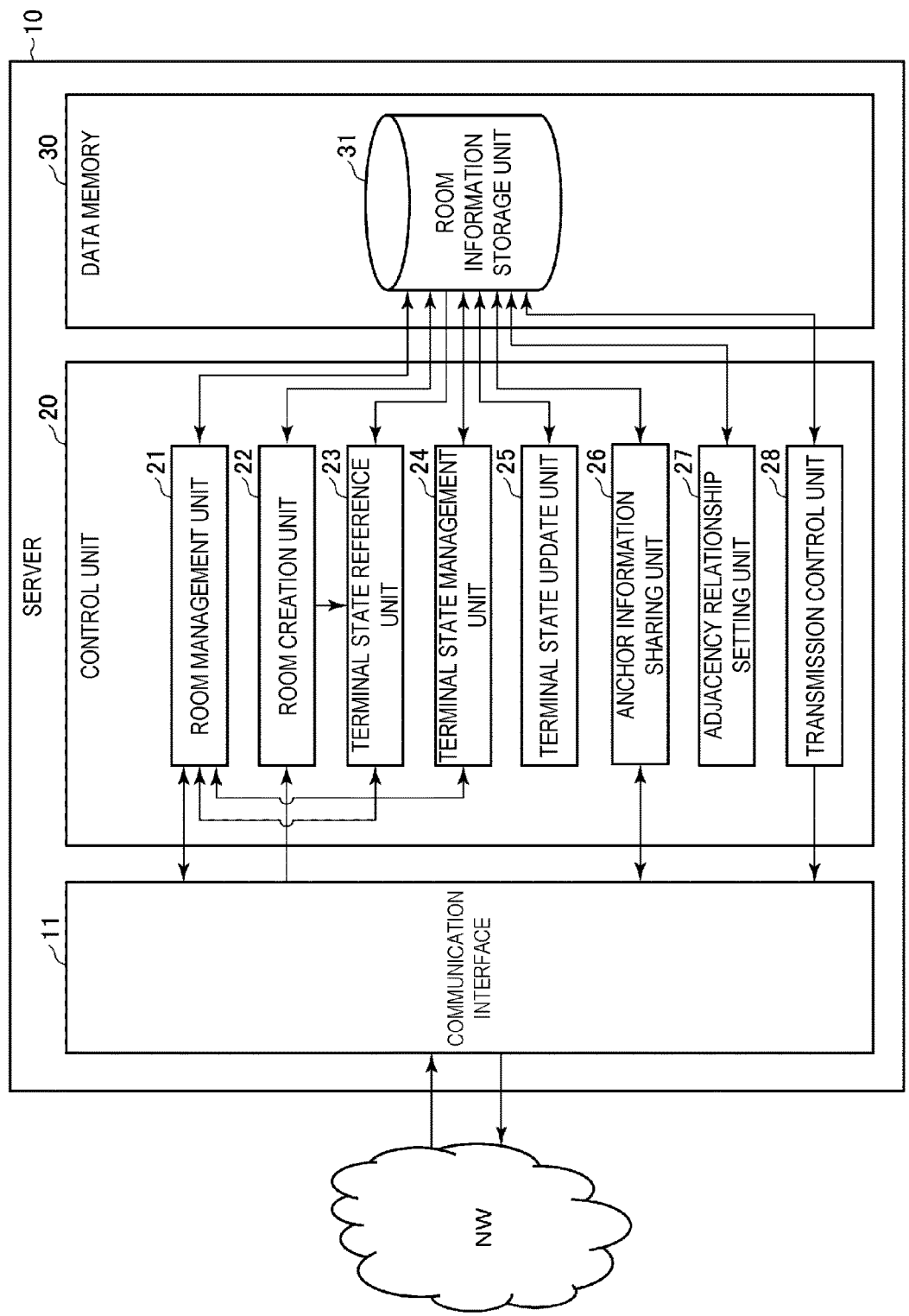
FIG. 5 is a block diagram illustrating a software configuration of the server apparatus according to one embodiment of the present disclosure.

FIG. 5 is a block diagram illustrating a software configuration of the server 10 according to one embodiment of the present disclosure in relation to the hardware configuration illustrated in FIG. 4.

A room information storage unit 31 is provided in a storage region of the data memory 30.

The room information storage unit 31 stores the 3D information and the anchor information received from the MR terminal 100 as the "room" for each corresponding mixed reality space. In addition, for each room, the room information storage unit 31 can store adjacent spatial information for identifying the room having the adjacency relationship. The room information storage unit 31 can store the 3D information, the anchor information, and the adjacent spatial information by linking the 3D information, the anchor information, and the adjacent spatial information to information for identifying each room. The room information storage unit 31 may be provided as an external storage medium or a storage apparatus such as a database server arranged in a cloud.

A control unit 20 is configured with the hardware processor 20A and the program memory 20B. A room management unit 21, a room creation unit 22, a terminal state reference unit 23, a terminal state management unit 24, a terminal state update unit 25, an anchor information sharing unit 26, an adjacency relationship setting unit 27, and a transmission control unit 28 are included as software processing function units. All of the processing function units are implemented by causing the hardware processor 20A to execute the program stored in the program memory 20B. Alternatively, the control unit 20 may be implemented in other diverse forms including an integrated circuit such as an ASIC or an FPGA.

The room management unit 21 functions as a mixed space management unit. The room management unit 21 performs processing of determining whether the corresponding room is present, by comparing information stored in the room information storage unit 31 with the 3D information received from the MR terminal 100, and returning a determination result to the MR terminal 100. In addition, for example, each time the room management unit 21 receives the 3D information from the MR terminal 100, the room management unit 21 performs processing of passing information indicating a room in which the MR terminal 100 is placed to the terminal state management unit 24.

In a case where a room creation request is received from the MR terminal 100, the room creation unit 22 performs processing of creating a room in response to the request.

The terminal state reference unit 23 performs processing of searching the information stored in the room information storage unit 31 and verifying a room in which the MR terminal 100 has been immediately previously placed. For example, each time the terminal state reference unit 23 receives the room creation request or the 3D information from the MR terminal 100, the terminal state reference unit 23 performs processing of verifying the room in which the MR terminal 100 has been immediately previously placed, based on a possibility that the MR terminal 100 of a transmission source has moved from the room.

The terminal state management unit 24 performs processing of receiving the information indicating the room in which the MR terminal 100 is currently placed, and managing the information stored in the room information storage unit 31.

In accordance with a determination that the MR terminal 100 has moved, the terminal state update unit 25 performs processing of accessing the room information storage unit 31 and changing the room in which the MR terminal 100 is placed. The terminal state update unit 25 may manage and update the information in cooperation with the terminal state management unit 24.

The anchor information sharing unit 26 performs processing of storing the anchor information received from the MR terminal 100 in the room information storage unit 31 by linking the anchor information to the corresponding room, so that the anchor information can be shared among the plurality of MR terminals.

In accordance with a determination that the MR terminal 100 has moved to a new room, and where a record indicating that the MR terminal 100 has been immediately previously placed in another room is present, the adjacency relationship setting unit 27 performs processing of estimating that the adjacency relationship is present between the new room and the other room, and setting the estimated adjacency relationship in the information stored in the room information storage unit 31.

The transmission control unit 28 performs processing of transmitting various types of information such as the information for identifying the room, information for identifying the real space, the anchor information of a space for which an instruction is provided, and the anchor information of an adjacent space in response to a request from the MR terminal 100.

(2) Operation (2-1) Summary of Operation of System

First, a summary of an operation for high-speed sharing of a plurality of mixed reality spaces and a summary of an operation for setting the adjacency relationship between rooms necessary for high-speed sharing of the mixed reality spaces will be described as an overall operation of the system.

(2-1-1) Sharing of Mixed Reality Space

Figure 6:
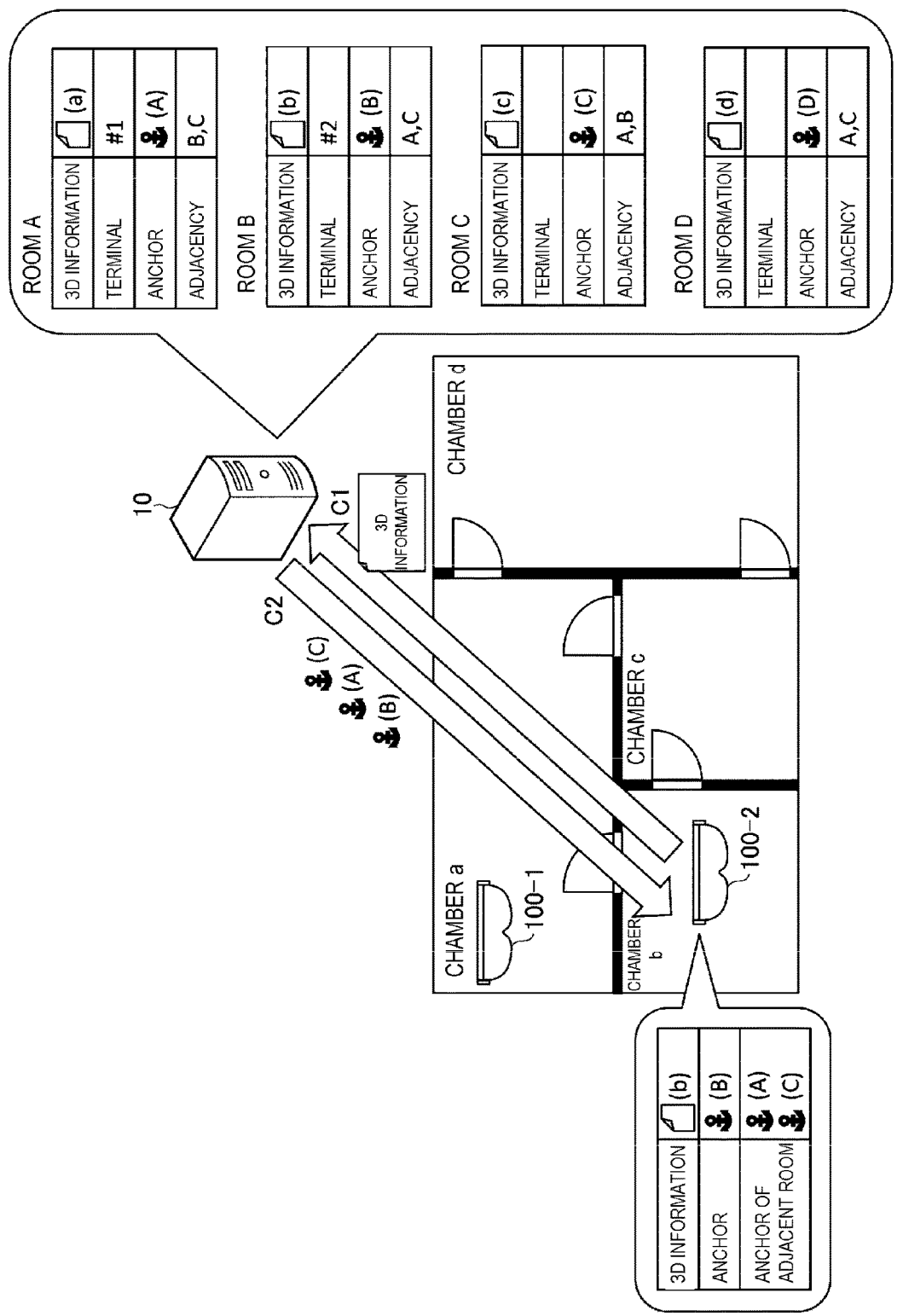
FIG. 6 is a diagram illustrating a first example of an operation of sharing a mixed reality space according to one embodiment of the present disclosure.
Figure 7:
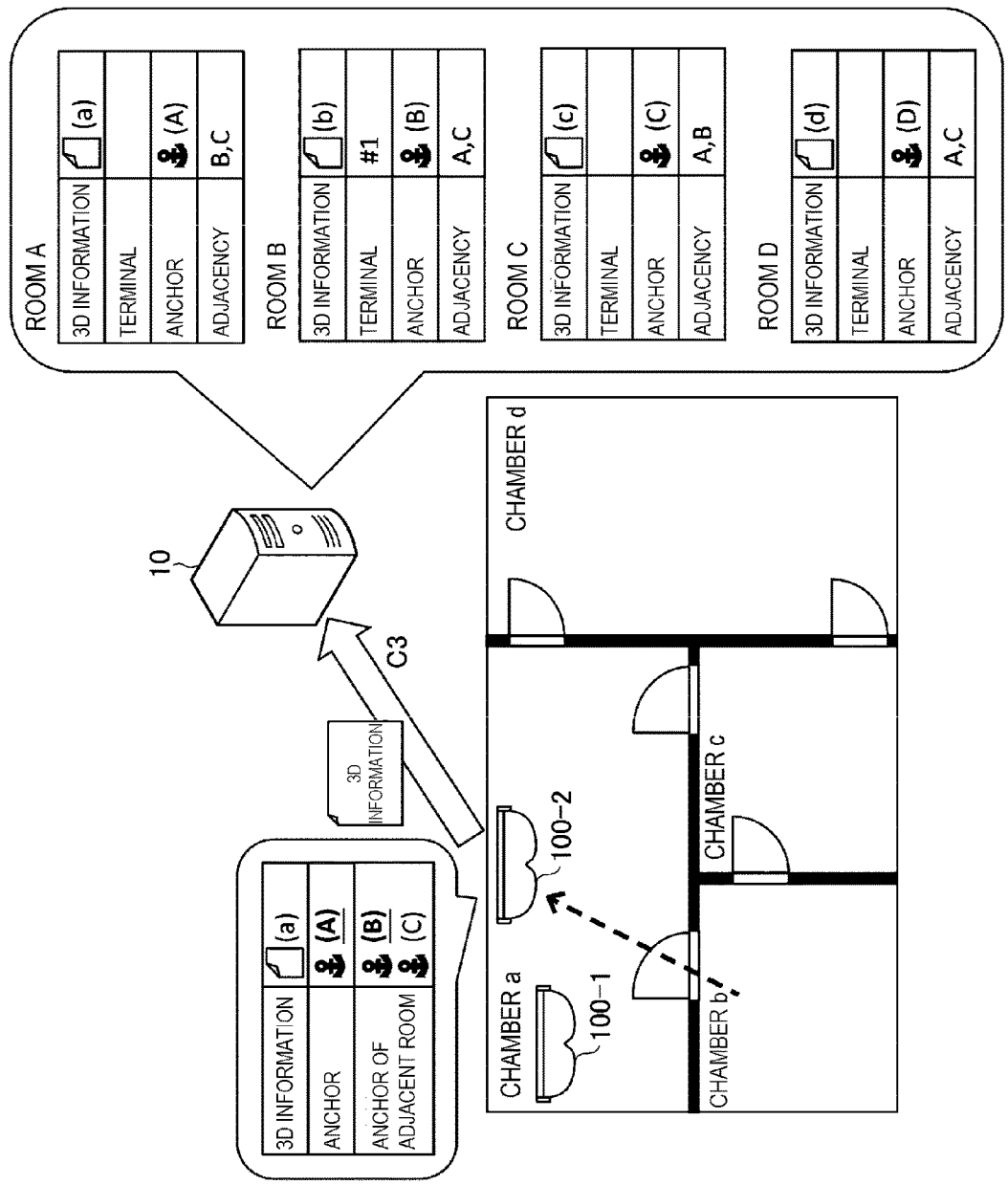
FIG. 7 is a diagram illustrating a second example of the operation of sharing the mixed reality space according to one embodiment of the present disclosure.

Each of FIG. 6 and FIG. 7 illustrates an example of the overall operation of the system for sharing the mixed reality space according to one embodiment of the present disclosure.

In FIG. 6, rooms A, B, C, and D are created in the server 10 for four chambers a, b, c, and d as the real space, respectively. For example, the rooms A, B, C, and D are stored in the room information storage unit 31. As illustrated in FIG. 6, information of each room includes the 3D information of a shape of the corresponding chamber (real space), identification information of the MR terminal 100 placed in the room, the anchor information, and the adjacency relationship between among the rooms. In addition, information of the MR terminal 100 includes the 3D information of the space in which the MR terminal 100 is currently present, the anchor information, and the anchor information of an adjacent room.

First, in FIG. 6, in a case where a user present in the chamber b starts the MR terminal 100-2 (hereinafter, an MR terminal #2) and connects to the server 10, the MR terminal #2 transmits the 3D information related to the shape of the chamber b to the server 10 for verifying whether the room linked to the chamber b is present on the server 10 (arrow C1).

The server 10 compares the 3D information received from the MR terminal #2 with the 3D information stored in the server 10, searches for a room having the 3D information of which a degree of similarity in shape is greater than or equal to a predetermined threshold and is the highest (that is, a room having the highest similarity greater than a constant reference), and returns a result to the MR terminal #2. In FIG. 6, the server 10 determines that the corresponding room (room B) is present in the chamber in which the MR terminal #2 is present, and returns the result to the MR terminal #2. In addition, the server 10 determines that the MR terminal #2 is present in the room B, and places the MR terminal #2 into the room B.

In a case where the MR terminal #2 is placed into the room B, the MR terminal #2 acquires not only the anchor information (B) of the room B but also the anchor information (A and C) of rooms adjacent to the room B (the room A and the room C) by inquiring to the server 10 (arrow C2).

Then, as illustrated in FIG. 7, in a case where the MR terminal #2 present in the chamber b is moved to the chamber a from the chamber b, the MR terminal #2 detects exiting of the MR terminal #2 from the chamber b based on the 3D information of the chamber b. The MR terminal #2 transmits the 3D information of the current space (chamber a) to the server 10 for verifying the current space (arrow C3). Then, in a case where a message indicating that the room A corresponding to the 3D information is present is returned from the server 10, the MR terminal #2 can start sharing the mixed reality space with the other MR terminal 100-1 (MR terminal #1) already present in the chamber A, because the MR terminal #2 already possesses the anchor information (A) of the room A.

The above operation example is not limited to an indoor space or the same real space and can be applied to sharing of the mixed reality space in an outdoor space or a case of sharing the same virtual information in different real spaces. As an example of application to the outdoor space, for example, sharing of a virtualized advertisement between a plurality of persons is illustrated. As an example of application to sharing between different real spaces, for example, showing the same content to students between classes at school is illustrated.

(2-1-2) Setting of Adjacency Relationship Between Rooms

Figure 8:
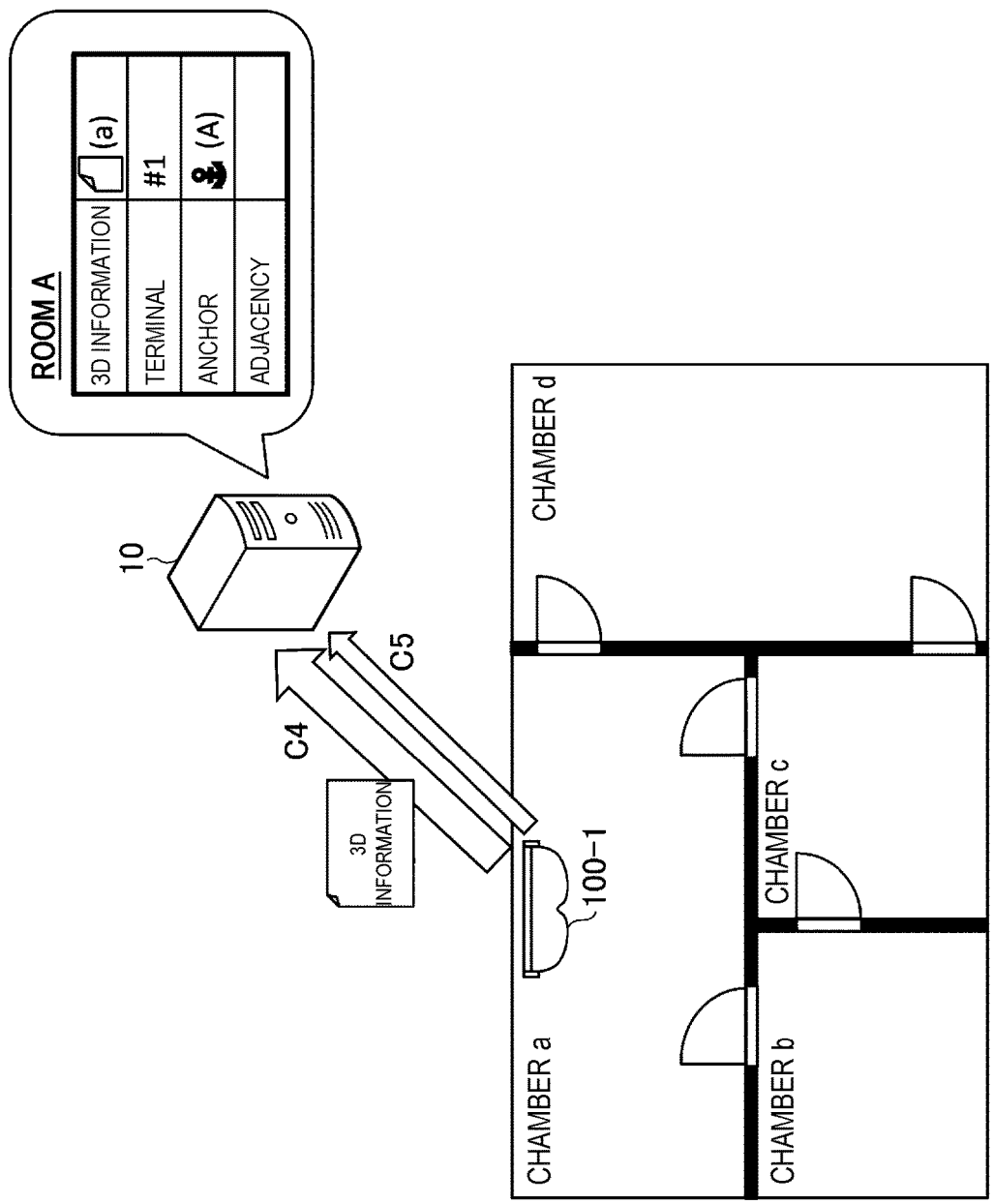
FIG. 8 is a diagram illustrating a first example of an operation of setting an adjacency relationship between rooms according to one embodiment of the present disclosure.
Figure 9:
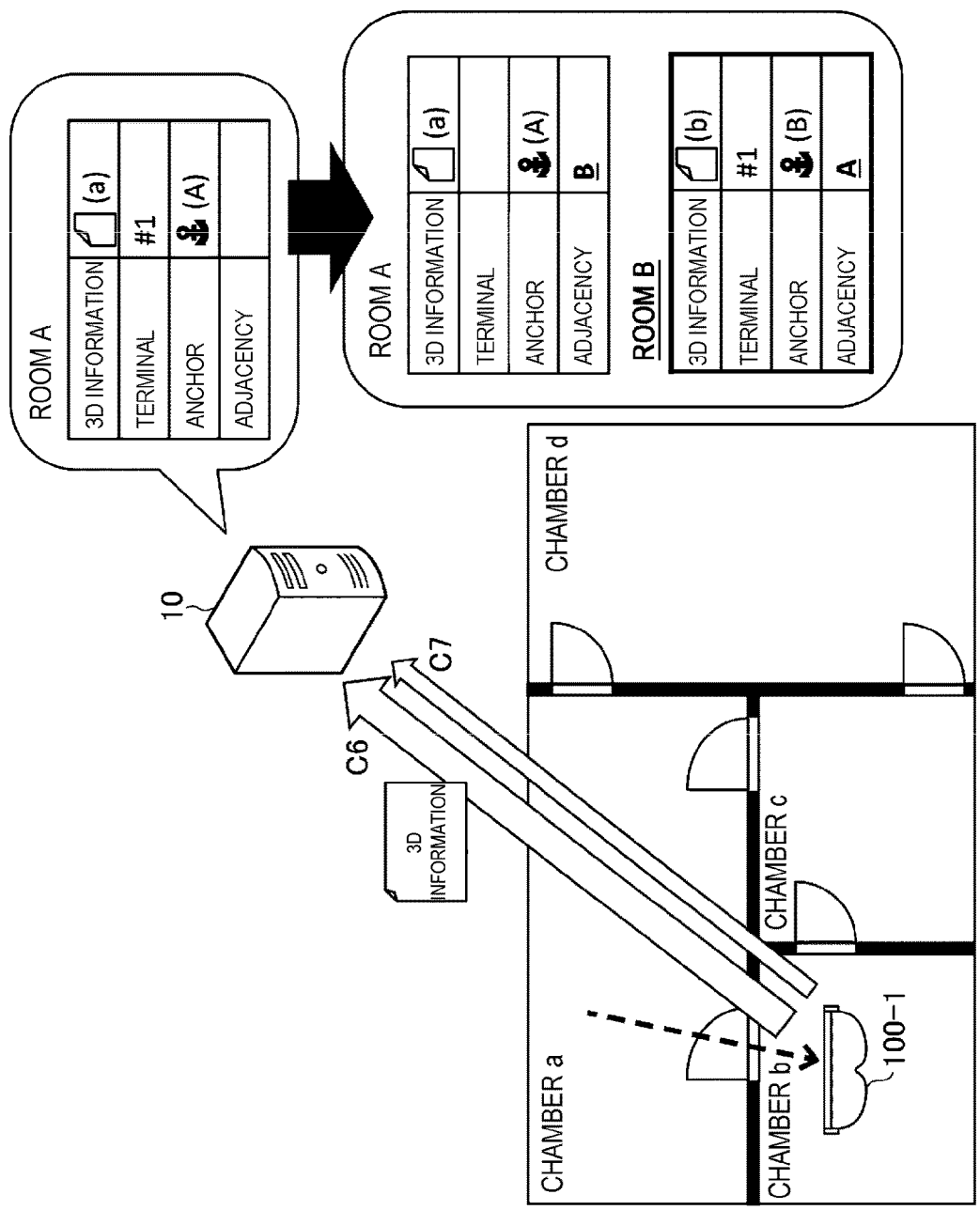
FIG. 9 is a diagram illustrating a second example of the operation of setting the adjacency relationship between the rooms according to one embodiment of the present disclosure.
Figure 10:
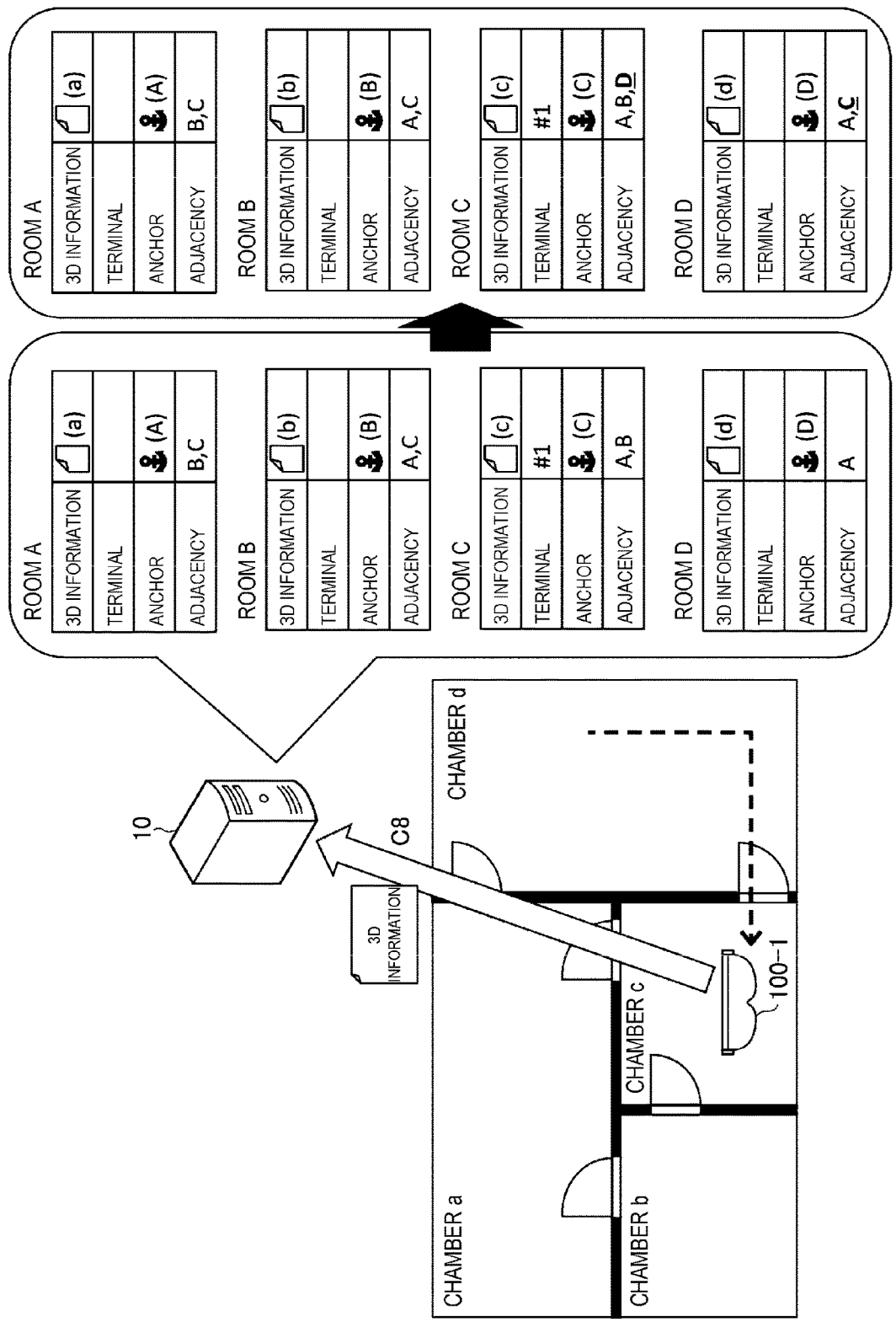
FIG. 10 is a diagram illustrating a third example of the operation of setting the adjacency relationship between the rooms according to one embodiment of the present disclosure.

Each of FIG. 8 to FIG. 10 illustrates an example of the overall operation of the system for setting the adjacency relationship between rooms according to one embodiment of the present disclosure.

In FIG. 8, in a case where the user starts the MR terminal 100-1 (MR terminal #1) in the chamber a, the MR terminal

1 first acquires and transmits the 3D information of the chamber a to the server 10 for verifying whether a room linked to the chamber a is present on the server 10 in the same manner as described above (arrow C4). In a case where the room is not present, the MR terminal #1 transmits the room creation request and the anchor information computed by the MR terminal #1 to the server 10 (arrow C5). The server 10 receiving the room creation request and the anchor information creates the room (in FIG. 8, the room A) and links the received 3D information to the anchor information (A). In addition, the server 10 determines that the MR terminal #1 is present in the room A, and links the room A to the MR terminal #1.

Then, in FIG. 9, in a case where the MR terminal #1 moves to the chamber b from the chamber a, the MR terminal #1 transmits the 3D information of the chamber b to the server 10 by using the same procedure as described above (arrow C6). In addition, in the same manner as described above, in a case where a room corresponding to the chamber b is not present, the MR terminal #1 transmits the room creation request to the server 10 (arrow C7) and transmits the computed anchor information (arrow C7). The server 10 creates the room B in response to the room creation request and the anchor information. The server 10 determines that the room A in which the MR terminal #1 has been immediately previously placed is spatially adjacent to the newly created room B, and sets the adjacency relationship between the room A and the room B. That is, the "room B" is added as "adjacency" information linked to the room A, and the "room A" is added as "adjacency" information linked to the room B.

Furthermore, as illustrated in FIG. 10, it is assumed that the room C and the room D are created, and that the adjacency relationship is set for each of the room C and the room D by using the same procedure. As illustrated in FIG. 10, in a case where the MR terminal #1 moves to the chamber c from the chamber d and verifies whether a room of the chamber c is present (that is, in a case where the 3D information of the chamber c is transmitted to the server 10) (arrow C8), the server 10 determines that a room corresponding to the chamber in which the MR terminal #1 is present (room C) is present, and returns a result to the MR terminal #1. In addition, at the same time, accordance with a determination that the room D in which the MR terminal #1 has been immediately previously present is spatially adjacent to the room C, and the adjacency relationship is set.

As described above, the server 10 can construct information of the adjacency relationship between rooms necessary for acquiring the anchor information of the adjacent room in advance.

In such a manner, in the information processing system according to one embodiment of the present disclosure, the MR terminal 100 can acquire not only the anchor information of the room in which the MR terminal 100 is placed, but also the anchor information of the adjacent room. Furthermore, the information processing system can verify a room to which a space in which the MR terminal 100 is currently present corresponds, and set the adjacency relationship between rooms in the server 10.

(2-1-3) Flow of Room Verification and Adjacency Relationship Setting Processing

Figure 11:
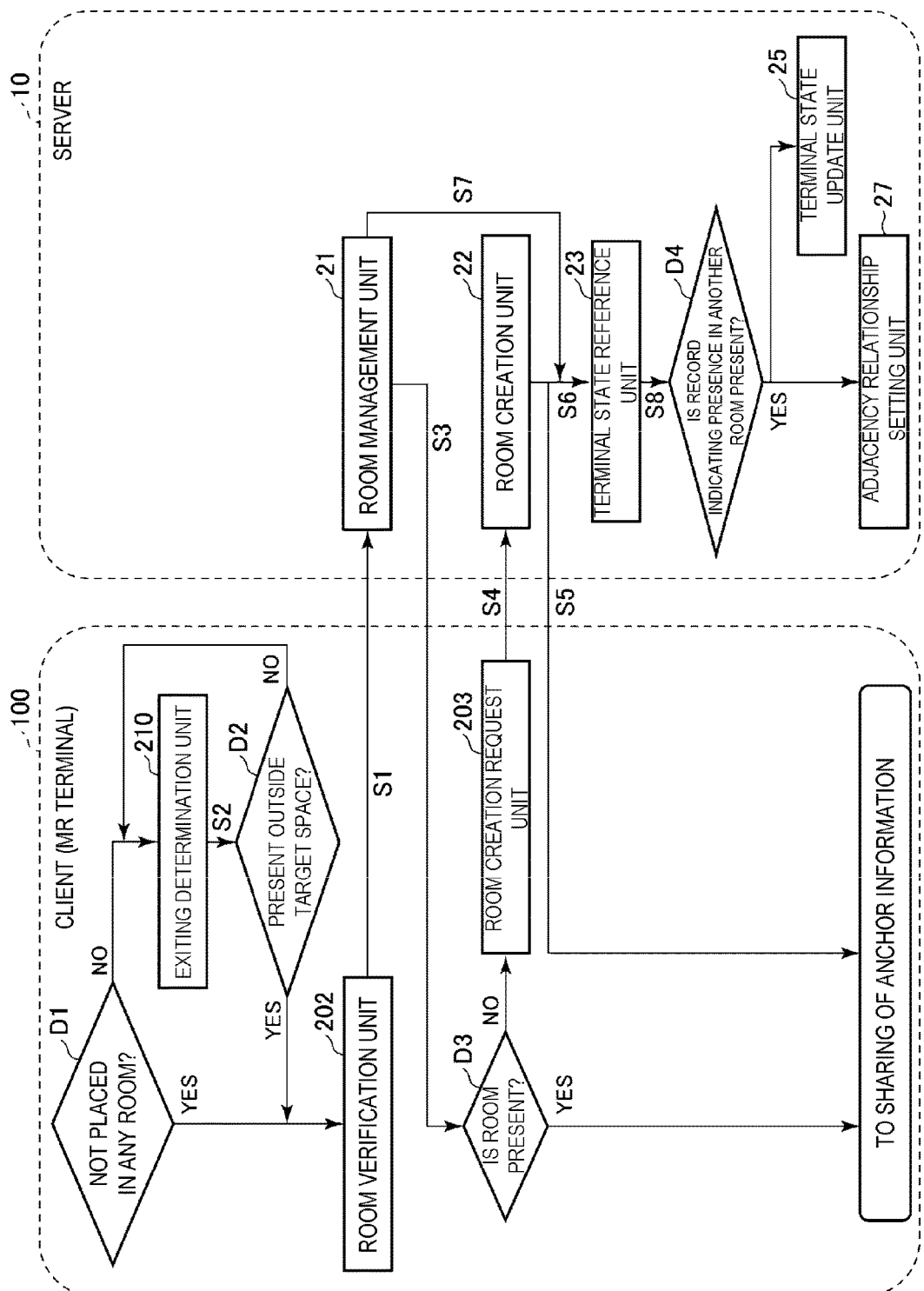
FIG. 11 is a diagram illustrating one example of processing of room verification and creation, and setting of the adjacency relationship according to one embodiment of the present disclosure.

Next, a flow of overall processing of the system for room verification and creation and setting of the adjacency relationship between rooms will be described. FIG. 11 is a diagram illustrating one example of such processing.

In a case where the MR terminal 100 as a client is started, the MR terminal 100 is first connected to the server 10. First, in determination block D1, the MR terminal 100 connected to the server 10 verifies whether the MR terminal 100 is placed in any room. For example, the MR terminal 100 verifies whether a record indicating placement in any room is present, by reading the information (for example, information of the lastly verified room) stored in the anchor information storage unit 131.

In accordance with a determination that the MR terminal 100 is not yet placed in any room (D1—YES), the room verification unit 202 of the MR terminal 100 acquires the 3D information of the real space in which the MR terminal 100 is currently present, transmits the 3D information to the server 10, and verifies whether a room of the space is already present (S1). Meanwhile, in accordance with a determination that the MR terminal 100 is placed in a certain room (for example, the room B) (D1—NO), for example, the MR terminal 100 verifies, periodically at predetermined time intervals, where the position of the MR terminal 100 is present in the 3D information of the MR terminal 100 under control of the exiting determination unit 210 (S2).

In determination block D2, in accordance with a determination that the position of the MR terminal 100 is present outside a target space of the room B (D2—YES), the MR terminal 100 determines that the MR terminal 100 has exited from the room, and the room verification unit 202 verifies whether a room corresponding to the current space is present, by transmitting the 3D information to the server 10 (S1). In accordance with a determination that the position of the MR terminal 100 is present in the target space of the room B (D2—NO), next, the MR terminal 100 determines whether the MR terminal 100 is present in the target space, at predetermined time intervals under control of the exiting determination unit 210.

After the 3D information is transmitted to the server 10 by the room verification unit 202 (S1), in a case where a response received from the server 10 (S3) indicates that a room corresponding to the 3D information is not present (D3—NO), the room creation request unit 203 requests the server 10 to create the room (S4). In a case where the response indicates that the room is present (D3—YES), a transition is made to processing for sharing the anchor information.

Meanwhile, in a case where the 3D information is received from the MR terminal 100 (S1), the room management unit 21 of the server 10 compares the received 3D information with the 3D information of the server 10 and searches for a room having the 3D information of which the degree of similarity in shape is greater than or equal to the threshold and is the highest. In a case where the room is present, the server 10 returns a result to the MR terminal 100 (S3) and links the received 3D information to the room. In a case where the room is not present, and the server 10 returns the result to the MR terminal 100 (S3), the server 10 receives the room creation request from the room creation request unit 203 of the MR terminal 100 (S4).

The server 10 receiving the room creation request creates a new room by the room creation unit 22 and stores the room in the room information storage unit 31 by linking the room to the received 3D information. In addition, in a case where the anchor information is received from the MR terminal 100, the server 10 stores the anchor information by further linking the anchor information to the created room.

Next, the room creation unit 22 returns information related to the created room to the MR terminal 100 (S5) and notifies the terminal state reference unit 23 that the room is created (S6). The terminal state reference unit 23 acquires information from the room management unit 21 for estimating the adjacency relationship (S7) or reads the information stored in the room information storage unit 31, and transitions to determination block D4 (S8). In determination block D4, the server 10 determines whether a record indicating that the MR terminal 100 transmitting the 3D information or the room creation request has been immediately previously present in any room is present. In accordance with a determination that a record indicating presence in another room (for example, the room A) is present (D4—YES), the adjacency relationship setting unit 27 sets the adjacency relationship between the room in which the MR terminal 100 is currently placed (room B) and the room A, and the terminal state update unit 25 updates the room in which the MR terminal 100 is placed from A to B. In accordance with a determination that the record indicating presence in another room is not present in determination block D4, the processing is finished.

(2-1-4) Flow of Processing of Sharing Mixed Reality Space

Figure 12:
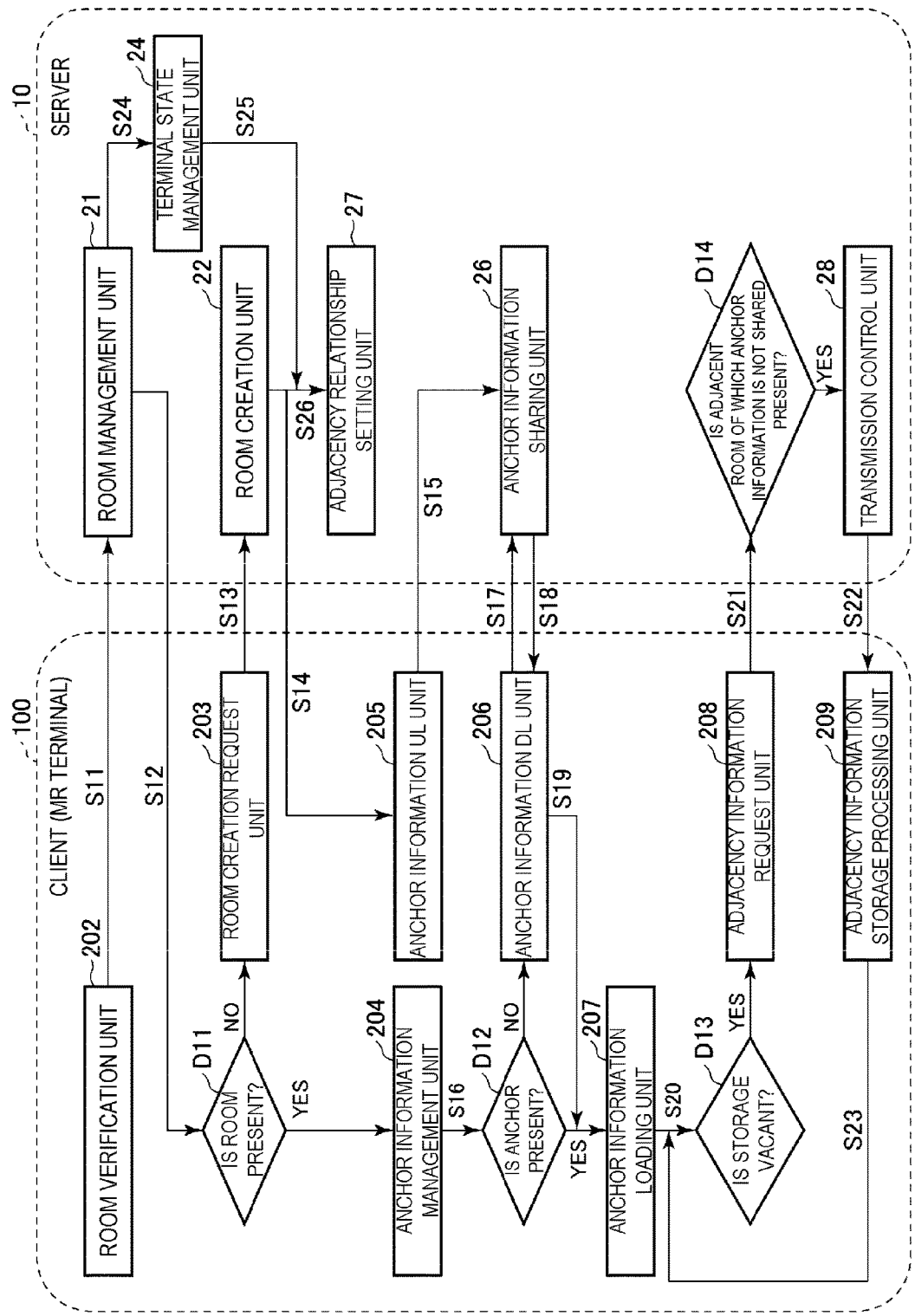
FIG. 12 is a diagram illustrating one example of processing of sharing the mixed reality space according to one embodiment of the present disclosure.

Next, a flow of overall processing of the system for sharing the mixed reality space will be described. FIG. 12 is a diagram illustrating one example of such processing.

In a case where the MR terminal 100 as the client is started and connected to the server 10, the room verification unit 202 of the MR terminal 100 transmits the acquired 3D information to the server 10 for verifying whether the room of the space desired to be shared is already present (S11). In accordance with a determination that the room is not present in the server (D11—NO), the room creation request unit 203 of the MR terminal 100 receiving the response from the server 10 (S12) requests the server 10 to create the room on the server 10 (S13). Then, in a case where information of the created room is received from the server 10 (S14), the anchor information upload (UL) unit 205 of the MR terminal 100 uploads the anchor information computed on the MR terminal 100 to the room (S15).

Meanwhile, in a case where the room is found in the server (D11—YES), the anchor information management unit 204 of the MR terminal 100 transitions to determination block D12 for verifying whether the anchor information of the room is stored on the MR terminal 100 (for example, on the anchor information storage unit 131) (S16).

In a case where the anchor information is stored on the MR terminal 100 (D12—YES), the MR terminal 100 reads and passes the anchor information to the anchor information loading unit 207. In a case where the anchor information is not stored (D12—NO), the anchor information download (DL) unit 206 of the MR terminal 100 requests the anchor information of the room from the server 10 (S17), downloads the anchor information (S18), and passes the anchor information to the anchor information loading unit 207 (S19).

Then, the anchor information loading unit 207 of the MR terminal 100 attaches the read or downloaded anchor information to the mixed reality space recognized by the MR terminal 100. This enables the MR terminals 100 placed in the same room to acquire the same anchor information, and consequently, the same mixed reality space can be viewed. In addition, the anchor information that is acquired once can be locally stored. Thus, in a case where the MR terminal 100 visits the target mixed reality space at the second time or later, the mixed reality space can be shared without downloading the anchor information.

Furthermore, the MR terminal 100 transitions to determination block D13 for determining whether a storage capable of storing another anchor information is vacant on the MR terminal 100 (S20). In determination block D13, in accordance with a determination that that the storage is vacant (D13—YES), the adjacency information request unit 208 of the MR terminal 100 requests information of the adjacent room and the anchor information linked to the room from the server 10 (S21) and downloads the anchor information from the server 10 (S22), and the adjacency information storage processing unit 209 stores the anchor information on the MR terminal 100. Then, a return may be made to determination block D13 again at any time (S23). In a case where the storage still vacant, information of still another adjacent room and the anchor information may be requested. In accordance with a determination that the storage is not vacant in determination block D13, the processing is finished.

Next, a flow on the server 10 side will be described. In a case where a verification message including the 3D information is received from the MR terminal 100 (S11), the room management unit 21 of the server 10 verifies the presence or absence of the room and responds to the MR terminal 100 (S12). In a case where the room is present, the server 10 transmits, from the room management unit 21 to the terminal state management unit 24, the most recent information on a room in which the MR terminal 100 is present (S24), and the terminal state management unit 24 adds the information in the room information storage unit 31. In a case where the room is not present, the server 10 receives the room creation request from the MR terminal (S13). Thus, the room creation unit 22 creates the requested room and transmits information of the created room to the MR terminal 100 (S14).

In a case where the anchor information is received from the MR terminal 100 (S15), the anchor information sharing unit 26 of the server 10 stores the received anchor information by linking the anchor information to the created room. Then, in a case where a request for the anchor information is received from another MR terminal 100 (for example, the MR terminal #2) placed in the same room, the server 10 can transmit the anchor information to the MR terminal #2.

As described above, in accordance with a determination that the MR terminal 100 has moved from the room based on information from the terminal state management unit 24 (S25) or information from the room creation unit 22 (S26), the adjacency relationship setting unit 27 verifies whether a record indicating immediately previous placement in another room is present. In a case where the record indicating placement in another room is present, the adjacency relationship setting unit 27 sets the adjacency relationship between the rooms based on the record.

In a case where a request for information related to the adjacent room is received from the MR terminal 100 (S21), the server 10 determines whether an adjacent room of which the anchor information is not shared is present (D14). In accordance with a determination that such an adjacent room is present (D14—YES), the transmission control unit 28 transmits information of the adjacent room and the anchor information linked to the room to the MR terminal 100 (S22). In accordance with a determination that the adjacent room of which the anchor information is not shared is not present in determination block D14, the processing is finished. At this point, a message indicating that the adjacent room is not present may be generated, and the server 10 may respond to the MR terminal 100 with the message.

(2-2) Operation of Information Processing Terminal

Figure 13:
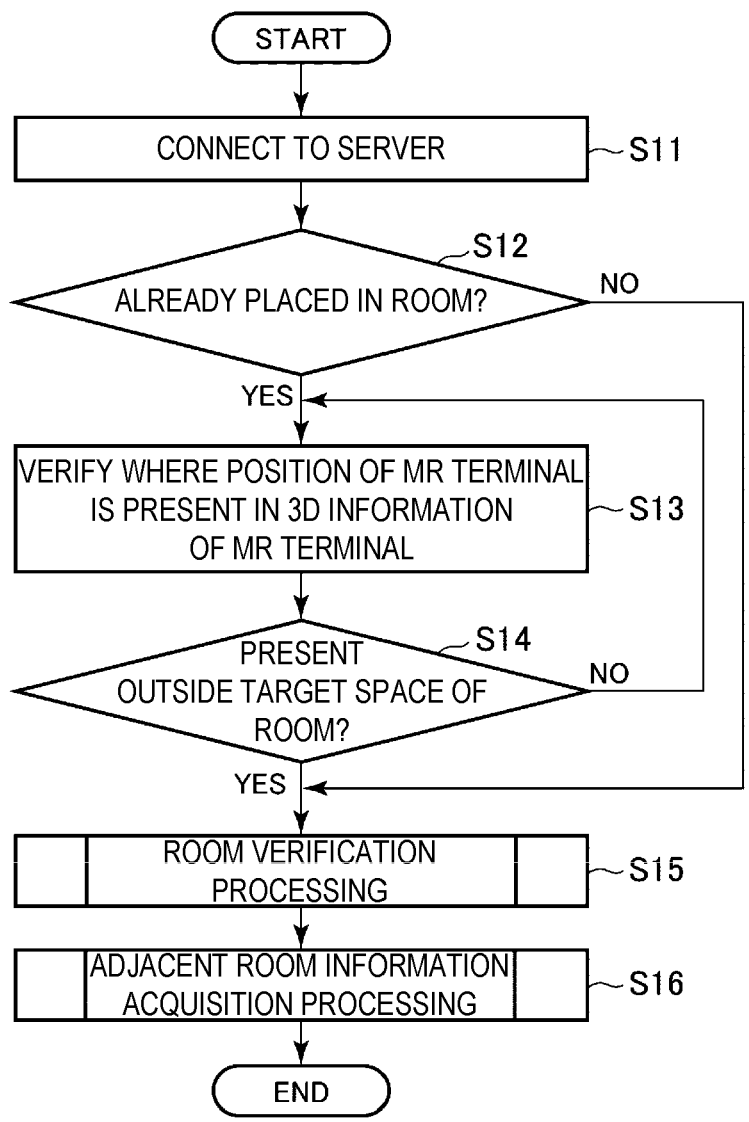
FIG. 13 is a flowchart illustrating one example of a processing procedure and a processing content of the information processing terminal illustrated in FIG. 5 from a start until acquisition of room information.

Next, an information processing operation of the MR terminal 100 as the information processing terminal having the above configuration will be further described. FIG. 13 is a flowchart illustrating a processing procedure and a processing content.

First, in a case where the MR terminal 100 is started, in step S11, the MR terminal 100 performs processing of establishing connection to the server 10 under control of the control unit 120.

Next, in step S12, the MR terminal 100, under control of the control unit 120, determines whether the MR terminal 100 is already placed in a room. In accordance with a determination that the MR terminal 100 is not yet placed in a room (NO), information processing of the MR terminal 100 transitions to room verification processing in step S15 for verifying a room to which the current chamber of the MR terminal 100 corresponds. Meanwhile, accordance with a determination that the MR terminal 100 is already placed in a room (YES), the information processing of the MR terminal 100 transitions to step S13.

In step S13, the exiting determination unit 210 of the MR terminal 100 verifies, under control of the control unit 120, where the position of the MR terminal 100 is present in the 3D information of the MR terminal 100.

In step S14, the exiting determination unit 210 of the MR terminal 100 determines whether the MR terminal 100 is outside the target space of the room. In accordance with a determination that the MR terminal 100 is present in the target space (NO), next, for example, at predetermined time intervals, the MR terminal 100 performs processing of verifying whether the MR terminal 100 has left. Meanwhile, in accordance with a determination that the MR terminal 100 is present outside the target space (YES), the information processing of the MR terminal 100 transitions to the room verification processing in step S15 for verifying a room to which the current chamber of the MR terminal 100 corresponds.

Figure 14:
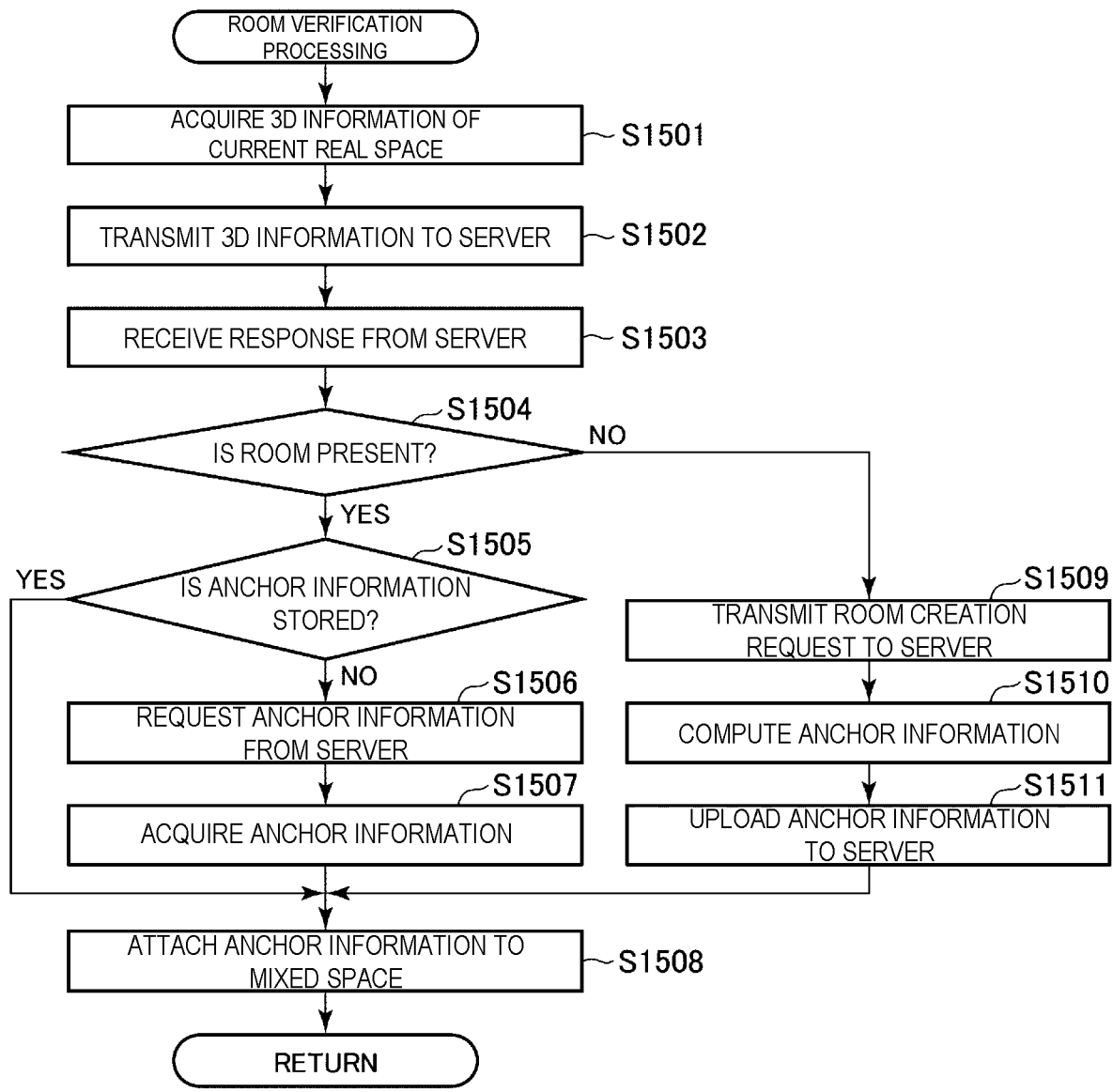
FIG. 14 is a flowchart illustrating one example of room verification processing in the flowchart illustrated in FIG. 13.

In step S15, the MR terminal 100 performs the room verification processing under control of the control unit 120. FIG. 14 is a flowchart illustrating one example of the room verification processing in step S15.

In step S1501, the spatial information acquisition unit 201 of the MR terminal 100 acquires the 3D information as the spatial information representing the current real space of the MR terminal 100 under control of the control unit 120. For example, the 3D information can include shape information of the space.

In step S1502, the room verification unit 202 of the MR terminal 100 transmits the acquired 3D information to the server 10 under control of the control unit 120.

In step S1503, the MR terminal 100 receives a response related to the presence or absence of the room from the server 10. For example, in a case where the room is present, the response includes information for identifying the room (room ID).

In step S1504, the room verification unit 202 of the MR terminal 100 determines whether the response received from the server 10 indicates that the room corresponding to the transmitted 3D information is present on the server 10. In accordance with a determination that the room is present (YES), the processing transitions to step S1505.

Next, in step S1505, the anchor information management unit 204 of the MR terminal 100 determines, under control of the control unit 120, whether necessary anchor information is stored in the MR terminal 100. For example, the anchor information management unit 204 determines whether the anchor information corresponding to the room is stored in the anchor information storage unit 131, based on the room ID included in the response received from the server 10. In accordance with a determination the anchor information is stored (YES), the processing transitions to step S1508. Meanwhile, in accordance with a determination the anchor information is not stored (NO), the processing transitions to step S1506 for acquiring the necessary anchor information.

In step S1506, the anchor information DL unit 206 of the MR terminal 100 requests the anchor information corresponding to the room ID from the server 10 under control of the control unit 120.

In step S1507, the MR terminal 100 acquires (downloads) the anchor information from the server 10.

Meanwhile, in step S1504, in accordance with a determination that the room is not present (NO), the processing transitions to step S1509.

In step S1509, the room creation request unit 203 of the MR terminal 100 transmits the room creation request to the server 10 under control of the control unit 120. Consequently, for example, a room ID for identifying a newly created room is transmitted to the MR terminal 100 from the server 10.

In step S1510, the MR terminal 100 computes and stores the anchor information in the anchor information storage unit 131 under control of the control unit 120. In a case where the received room ID of the newly created room is present, the computed anchor information may be stored by linking the anchor information to the room ID. Alternatively, the computed anchor information may be stored by linking the anchor information to the acquired 3D information.

In step S1511, the anchor information UL unit 205 of the MR terminal 100 uploads the computed anchor information to the server 10 under control of the control unit 120.

After the anchor information is downloaded from the server 10 in step S1507, or after the anchor information is computed in step S1510 (or furthermore, after the anchor information computed in step S1511 is uploaded to the server 10), the MR terminal 100 transitions to step S1508.

In step S1508, the anchor information loading unit 207 of the MR terminal 100 performs processing of attaching the acquired anchor information to the mixed reality space under control of the control unit 120. Then, the anchor information loading unit 207 passes data after processing to the output image generation unit 211, and accordingly, for example, the output image generation unit 211 can generate the output data such as the image representing the mixed reality space and output the output data to the output device 170 at any timing.

Figure 15:
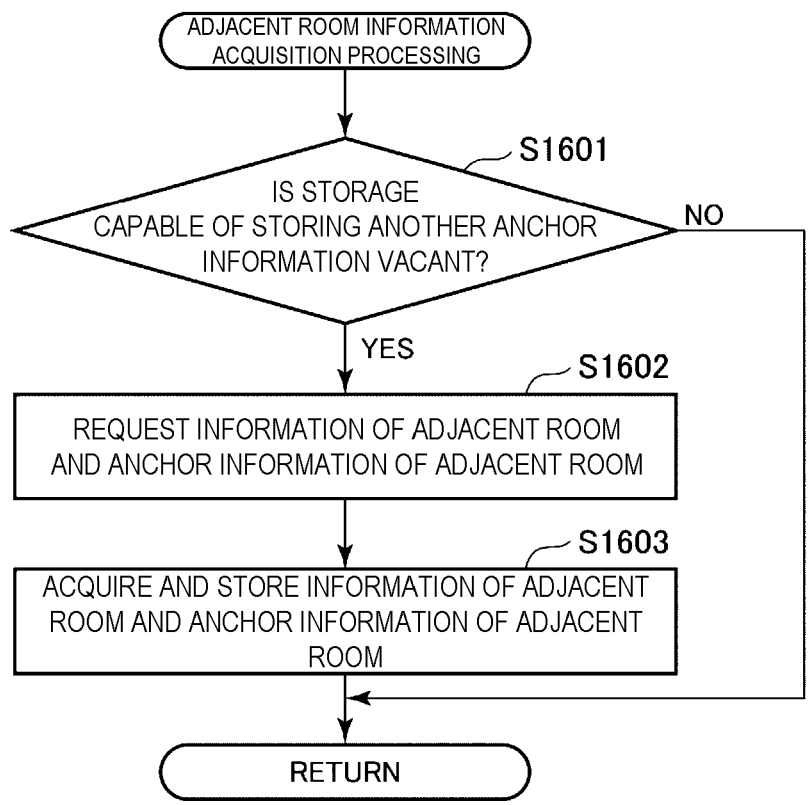
FIG. 15 is a flowchart illustrating one example of adjacent room information acquisition processing in the flowchart illustrated in FIG. 13.

As described above, after the current room of the MR terminal 100 is verified and the necessary anchor information is acquired, the MR terminal 100 transitions to step S16 in FIG. 13. In step S16, the MR terminal 100 performs adjacent room information acquisition processing under control of the control unit 120. FIG. 15 is a flowchart illustrating one example of the adjacent room information acquisition processing in step S16 illustrated in FIG. 13.

In step S1601, the MR terminal 100 determines, under control of the control unit 120, whether the storage capable of storing another anchor information is vacant. In accordance with a determination that the storage (for example, the anchor information storage unit 131) is not vacant (NO), the processing is finished. In accordance with a determination that the storage is vacant (YES), the processing transitions to step S1602.

In step S1602, the adjacency information request unit 208 of the MR terminal 100 requests, under control of the control unit 120, information (for example, the room ID) of the adjacent room having the adjacency relationship with the room in which the MR terminal 100 is currently placed, and the anchor information of the adjacent room. At this point, the MR terminal 100 may request one adjacent room and the anchor information depending on vacancy of the storage, or in a case where a plurality of adjacent rooms are present, may request the plurality of adjacent rooms and the anchor information of each adjacent room.

In step S1603, the MR terminal 100 acquires the requested information of the adjacent room and the anchor information of the adjacent room under control of the control unit 120 and stores the information of the adjacent room and the anchor information of the adjacent room in the anchor information storage unit 131 under control of the adjacency information storage processing unit 209. For example, the anchor information storage unit 131 can store the room ID and the anchor information by linking the room ID to the anchor information. Furthermore, the anchor information storage unit 131 may store the entirety or a part of the acquired spatial information by linking the entirety or the part of the spatial information to the room ID.

Each processing illustrated in FIG. 13 to FIG. 15 is not limited to the illustrated order. The order may be changed, or a plurality of types of processing may be performed at the same time in parallel, provided that the same effect is achieved. In addition, several types of processing may be omitted or replaced with similar types of processing. Alternatively, processing illustrated by one step may be performed in a plurality of steps, and processing illustrated by a plurality of steps may be performed in one step.

(2-3) Operation of Server

Figure 16:
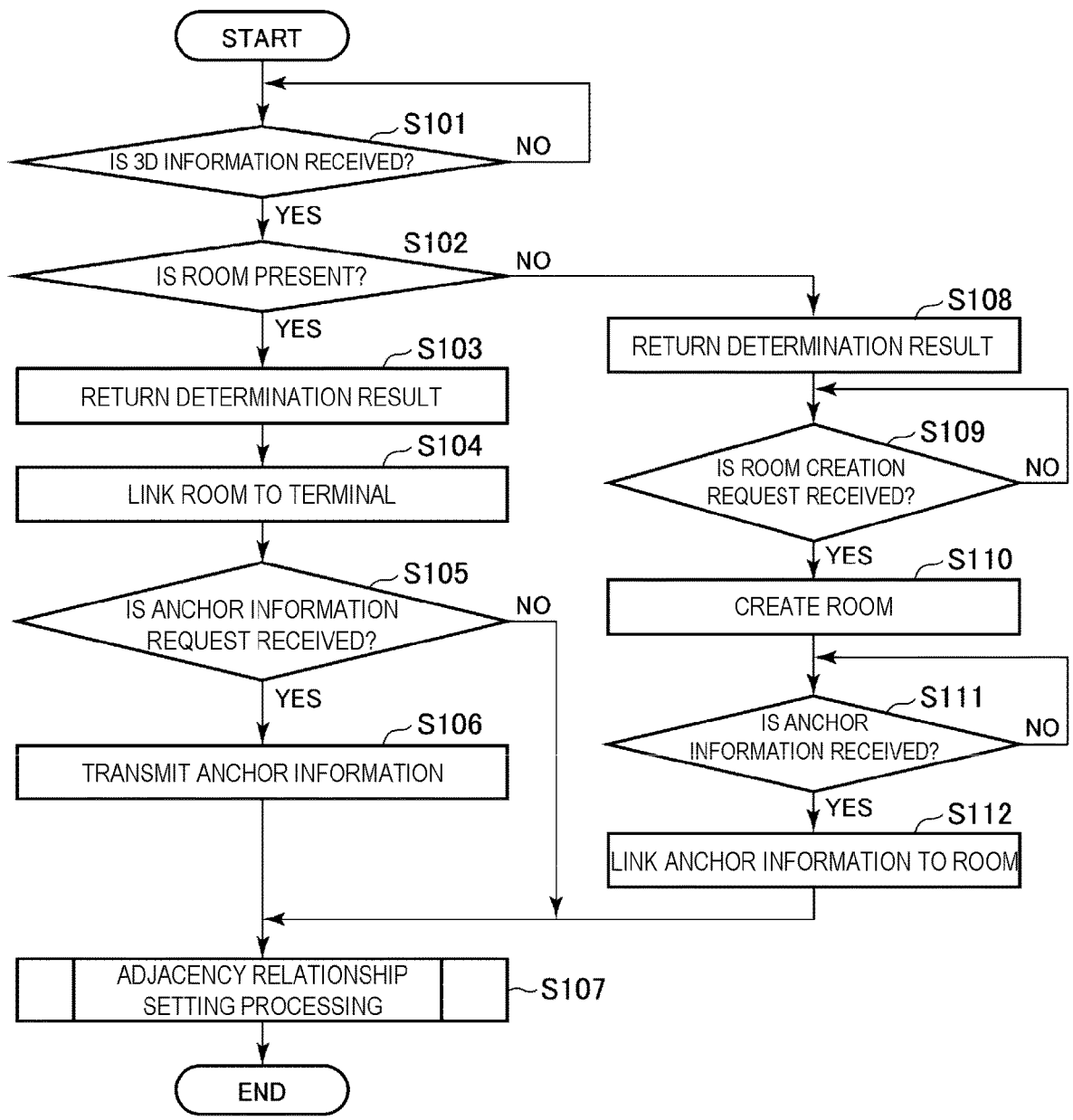
FIG. 16 is a flowchart illustrating one example of a processing procedure and a processing content of the server illustrated in FIG. 3.

Next, an information processing operation of the server 10 having the above configuration will be described. FIG. 16 is a flowchart illustrating one example of a processing procedure and a processing content. The server 10 is assumed to have established connection to the MR terminal 100 in advance.

First, in step S101, the server 10 monitors reception of the 3D information from the MR terminal 100 under control of the control unit 20. In this state, in a case where the 3D information is received from the MR terminal 100 (YES), the processing transitions to step S102.

Next, in step S102, the room management unit 21 of the server 10 determines, under control of the control unit 20, whether a room corresponding to the 3D information received from the MR terminal 100 is present in the room information storage unit 31. As described above, for example, by comparing the 3D information, the room management unit 21 searches for a room of which the degree of similarity in shape is greater than or equal to a constant level and is the highest. In accordance with a determination that the room is present (YES), the processing transitions to step S103.

In step S103, the server 10 performs processing of returning a determination result to the MR terminal 100 under control of the control unit 20. For example, the server 10 generates a message including information for identifying the room (for example, the room ID) and transmits the message to the MR terminal 100.

Next, in step S104, the server 10 performs processing of linking the room to the MR terminal 100 of the transmission source of the 3D information under control of the control unit 20.

In step S105, the server 10 determines, under control of the control unit 20, whether a request for the anchor information is received from the MR terminal 100. As described above, the MR terminal 100 determines whether the anchor information corresponding to the room ID is stored on the MR terminal 100, based on the room ID included in the message transmitted by the server 10. In a case where the anchor information is not stored, the MR terminal 100 requests the anchor information from the server 10. In accordance with a determination that a message requesting the anchor information is received from the MR terminal 100 (YES), the server 10 transitions to step S106. In accordance with a determination that the message is not received (NO), the server 10 transitions to step S107 for adjacency relationship setting processing. In one embodiment, the server 10 waits for a constant time period after returning the determination result of the presence or absence of the room to the MR terminal 100. In a case where the request is not received within the time period, the server 10 is configured to transition to step S107 (proceed to NO in determination step S105).

In step S106, the server 10 reads, by the anchor information sharing unit 26 under control of the control unit 20, the anchor information requested by the MR terminal 100 from the room information storage unit 31 based on the room ID, transmits the anchor information to the MR terminal 100 of a request source, and then, transitions to step S107 for the adjacency relationship setting processing.

In step S102, in accordance with a determination at the room management unit 21 that the room is not present (NO), the processing transitions to step S108.

In step S108, the server 10 performs processing of returning the determination result to the MR terminal 100 under control of the control unit 20. For example, the server 10 generates a message indicating that the room is not present, and transmits the message to the MR terminal 100.

Next, in step S109, the server 10 monitors reception of the room creation request from the MR terminal 100 under control of the control unit 20. In a case where the room creation request is received (YES), the server 10 transitions to step S110. In step S109, in a case where the room creation request is not received even after an elapse of a constant time period, the server 10 may perform processing of returning the determination result to the MR terminal 100 again or may finish the processing.

In step S110, the server 10 receiving the room creation request from the MR terminal 100 performs processing of creating a new room by the room creation unit 22 under control of the control unit 20. At this point, the server 10 stores the 3D information received in step S101 in the room information storage unit 31 by linking the 3D information to the newly created room.

Next, in step S111, the server 10 monitors reception of the anchor information from the MR terminal 100 under control of the control unit 20. In a case where the anchor information is received (YES), a transition is made to step S112. In a case where the anchor information is not received even after an elapse of a constant time period in step S111, the server 10 may request the MR terminal 100 to upload the anchor information or may finish the processing.

Next, in step S112, the anchor information sharing unit 26 of the server 10 stores the received anchor information in the room information storage unit 31 by linking the anchor information to the newly created room under control of the control unit 20. Then, the server 10 transitions to step S107 for the adjacency relationship setting processing.

Figure 17:
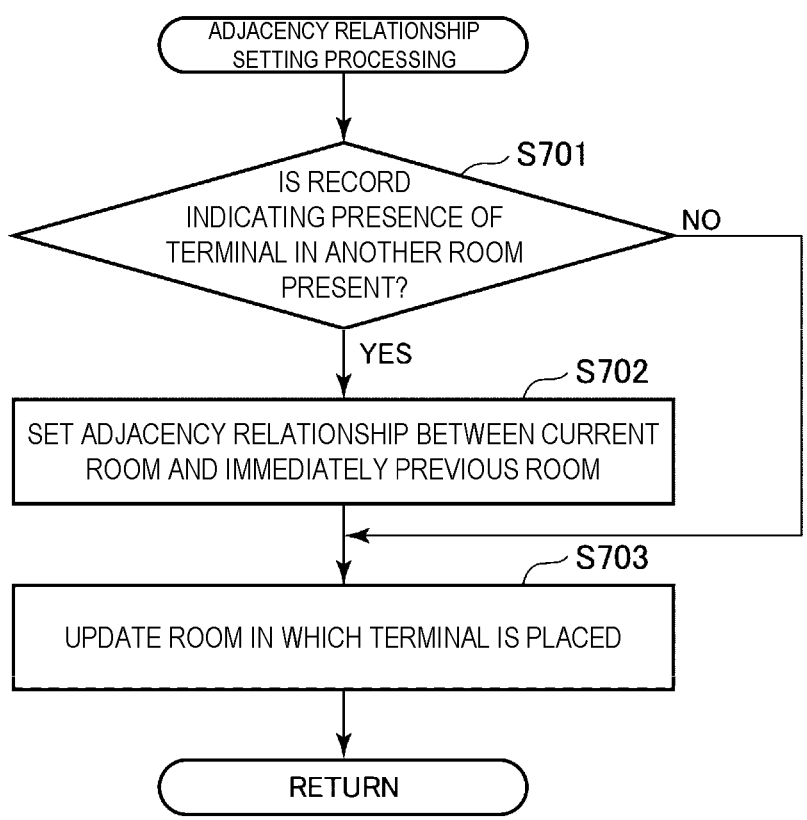
FIG. 17 is a flowchart illustrating one example of adjacency relationship setting processing in the flowchart illustrated in FIG. 16.

In step S107, the server 10 performs the adjacency relationship setting processing under control of the control unit 20. FIG. 17 is a flowchart illustrating one example of the adjacency relationship setting processing in step S107 illustrated in FIG. 16.

First, in step S701, the server 10, by the terminal state reference unit 23 under control of the control unit 20, verifies whether a record indicating that the MR terminal 100 of the transmission source of the 3D information has been immediately previously present in another room is present in the room information storage unit 31. In a case where the record indicating presence in another room is present (YES), the processing transitions to step S702. In a case where the record indicating presence in another room is not present (NO), the processing transitions to step S703 by skipping step S702.

In step S702, the server 10, by the adjacency relationship setting unit 27 under control of the control unit 20, estimates that the room corresponding to the received 3D information is adjacent to the recorded other room, and sets the adjacency relationship in the information stored in the room information storage unit 31 for each room.

Next, in step S703, the server 10, by the terminal state update unit 25 under control of the control unit 20, changes the room in which the MR terminal 100 is placed to the room corresponding to the most recent 3D information received.

(3) Validation

A simulation experiment for verifying validity of processing of downloading the anchor information of the adjacent room in advance in the information processing system 1 according to the embodiment is performed by imitating the following environment in HoloLens.

A server program operates on a laptop PC (memory: 16 GB, CPU: Intel (registered trade name) Core i7, 2.8 GHz, OS: Windows (registered trade name) 10, 64 bit), and HoloLens and the laptop PC are connected through Wi-Fi. In addition, communication between HoloLens and the laptop PC is performed by using UDP.

(Condition 1) It is assumed that 81 rooms are created on the server 10, and that the anchor information is uploaded to each room.

(Condition 2) It is assumed that the MR terminal 100 can recognize exiting out of the mixed reality space of a certain room and placement into another room.

(Condition 3) The adjacency relationship among the rooms is set, and the MR terminal 100 recognizes the adjacency relationship. The number of rooms adjacent to a certain room is N. In a case where the MR terminal 100 moves from the room, it is assumed that the MR terminal 100 moves by randomly selecting one of rooms adjacent to the room in which the MR terminal 100 is currently placed.

(Condition 4) After moving from the room, the MR terminal 100 waits for T seconds and then, moves to a subsequent room. This movement is performed total 10 times.

(Condition 5) It is assumed that K pieces of anchor information can be stored on the MR terminal 100.

The above environment assumes a situation in which each chamber or corridor in the same building as a space of one sharing target is linked to a different room. In the above environment, five trials are performed by changing a random number at each trial, and average values of the following indicators are computed.

(Indicator 1) Delay time period: a time period required from placement of the MR terminal 100 into a room until completion of attachment of the anchor information (Indicator 2) Number of anchor information requests: the number of times the MR terminal 100 requests the anchor information from the server 10

In addition, as a comparative method, processing related to downloading of the anchor information uses a method of downloading the anchor information of the room from the server 10 at each placement into a new room, in the same manner as a technology of the related art.

Figure 18:
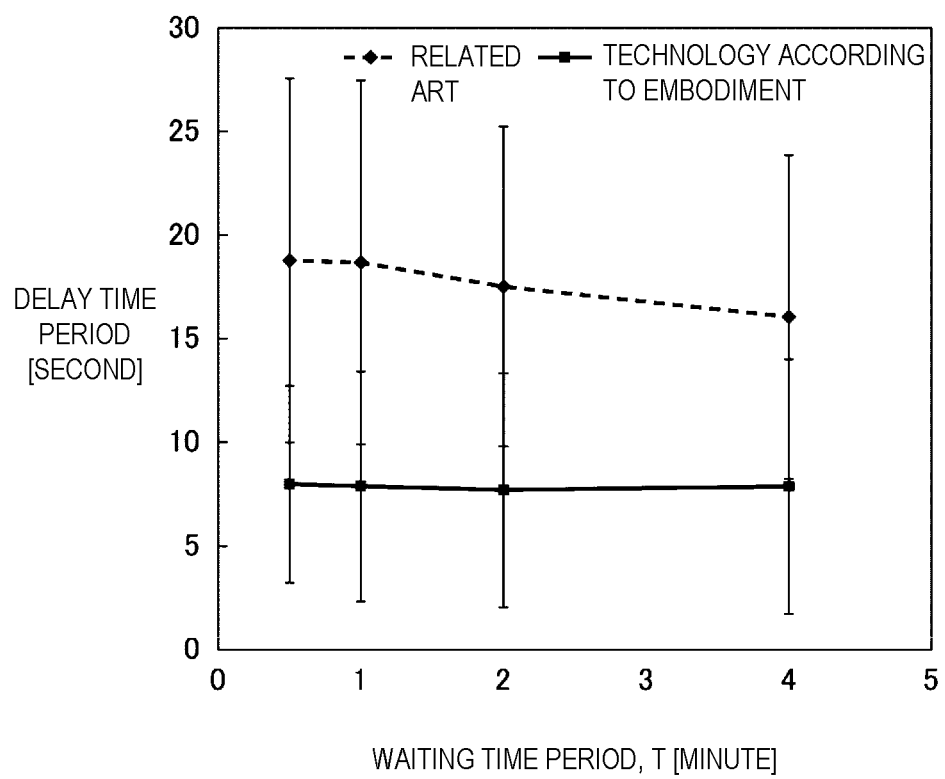
FIG. 18 is a diagram illustrating a validation result of a delay time period when a waiting time period is changed.
Figure 19:
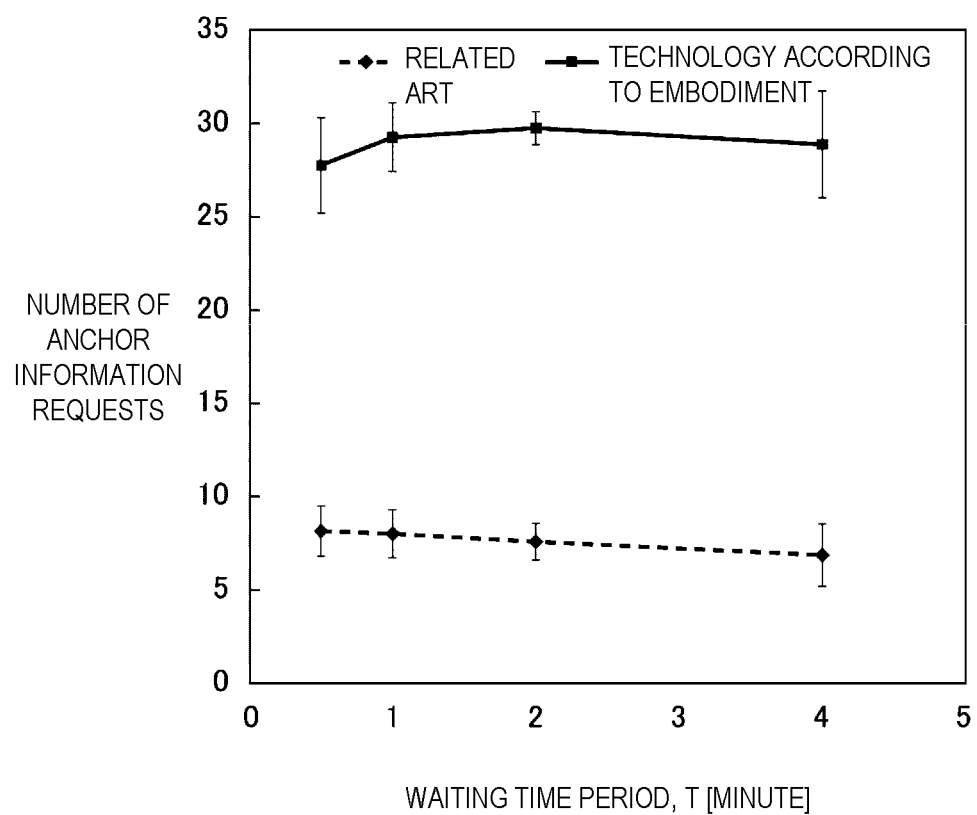
FIG. 19 is a diagram illustrating a validation result of the number of anchor information requests when the waiting time period is changed.

FIG. 18 and FIG. 19 show results in a case of changing a waiting time period T in each room when the number of stored anchors is five (K=5) and the number of adjacencies of the room is four (N=4). FIG. 18 shows a change in delay time period [second] with respect to the waiting time period T [minute] in each room, and FIG. 19 shows a change in number of anchor information requests with respect to the waiting time period T [minute] in each room.

From the result in FIG. 18, it is perceived that in the information processing system 1 according to the embodiment, the delay time period until the start of sharing of the mixed reality space can be reduced to approximately half, compared to the technology of the related art. This is because in the information processing system 1, the anchor information of the room adjacent to the current room can be downloaded before moving to the room, based on the adjacency relationship among the rooms constructed in the server 10.

Meanwhile, from the result in FIG. 19, it is perceived that in the information processing system 1 according to the embodiment, the number of times the anchor information is requested from the server 10 is increased, compared to the technology of the related art. This is because not only the anchor information of the current room but also the anchor information of the adjacent room are downloaded as described above.

Figure 20:
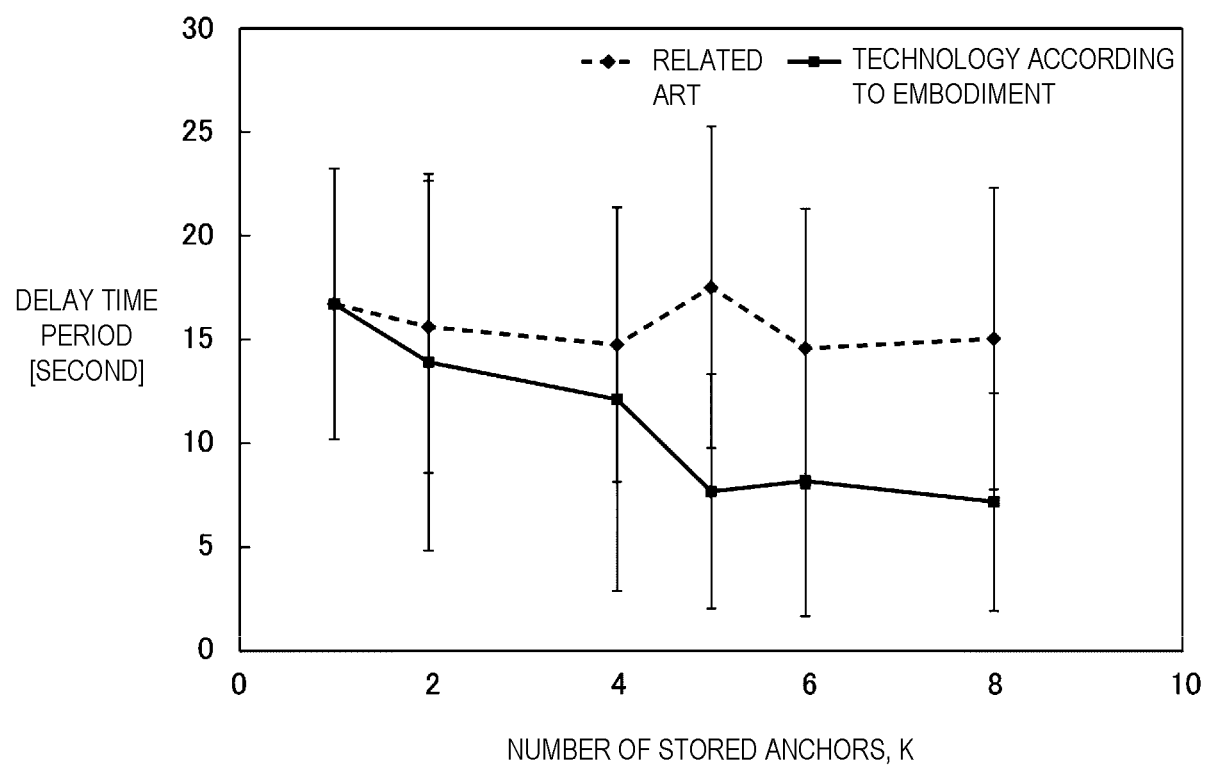
FIG. 20 is a diagram illustrating a validation result of the delay time period when the number of stored anchors is changed.
Figure 21:
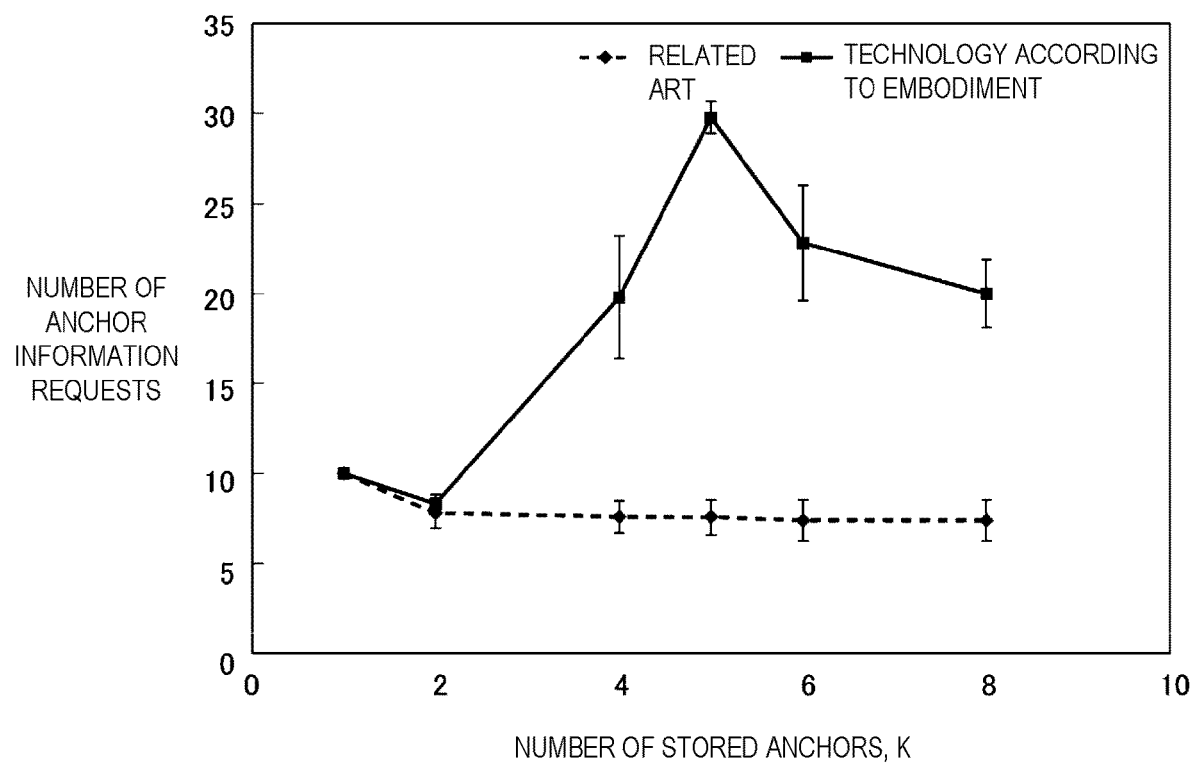
FIG. 21 is a diagram illustrating a validation result of the number of anchor information requests when the number of stored anchors is changed.

FIG. 20 and FIG. 21 show results in a case of changing a number K of anchors that can be stored on the MR terminal 100 when the waiting time period in each room is two minutes (T=2 minutes) and the number of adjacencies of the room is four (N=4). FIG. 20 shows a change in delay time period [second] with respect to the number K of stored anchors, and FIG. 21 shows a change in number of anchor information requests with respect to the number K of stored anchors.

From the result in FIG. 20, it is perceived that as the number of anchors that can be stored on the MR terminal 100 is increased, the delay time period until the start of sharing of the mixed reality space is decreased. Meanwhile, when the number of anchors that can be stored is one, approximately the same delay time period as the technology of the related art occurs. This is because in a case where the MR terminal 100 can store only one piece of anchor information on the MR terminal 100, only the anchor information of the current room can be stored, and the anchor of the adjacent room cannot be acquired. Consequently, as shown in FIG. 21, the number of anchor information requests also has a value almost equivalent to the technology of the related art.

Figure 22:
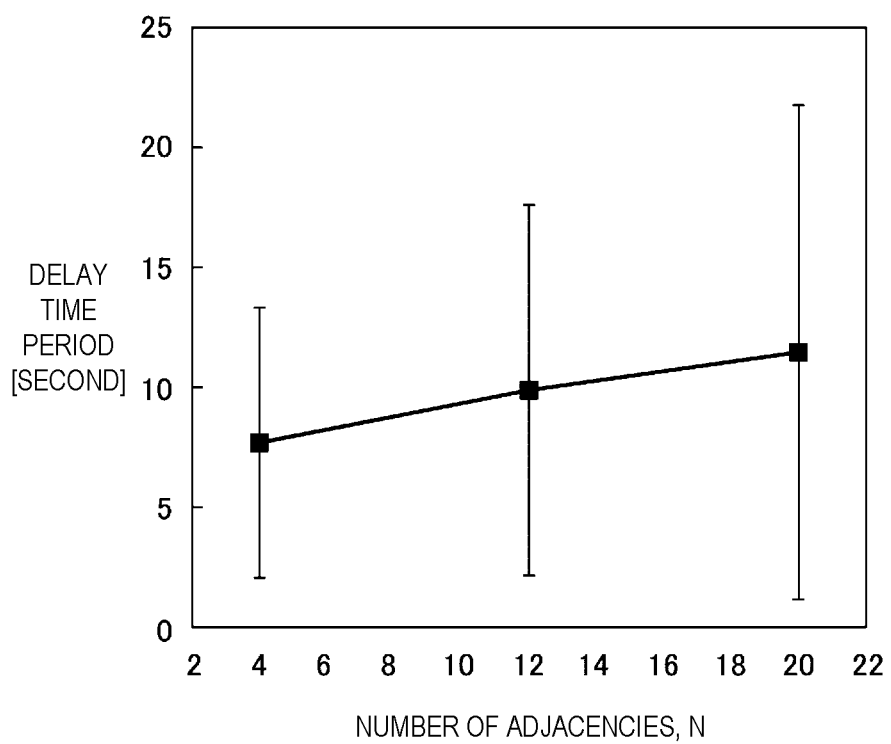
FIG. 22 is a diagram illustrating a validation result of the delay time period when the number of adjacencies of a room is changed.
Figure 23:
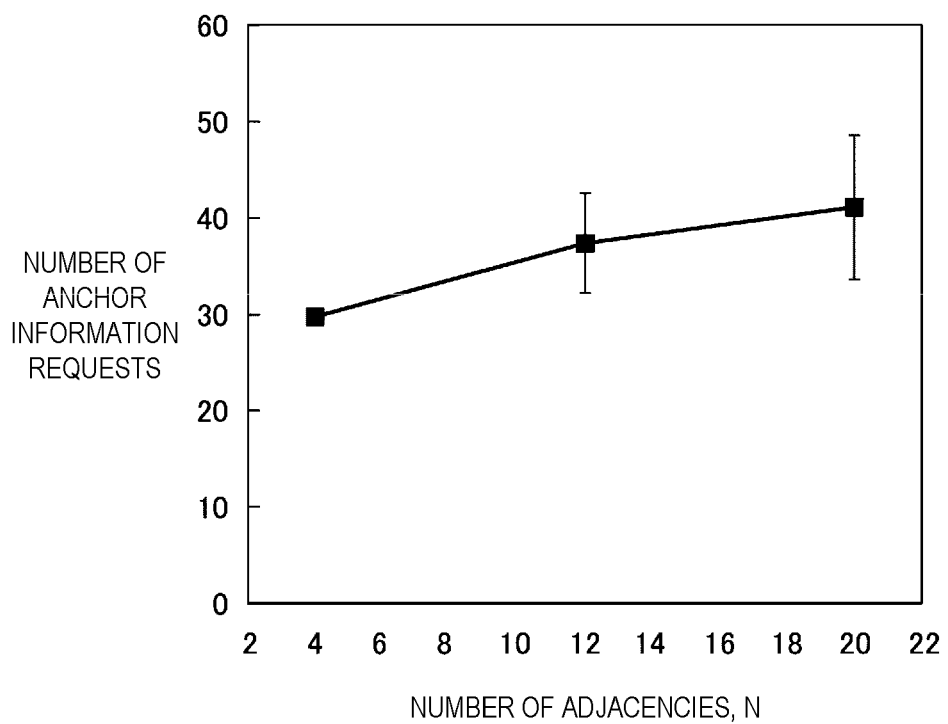
FIG. 23 is a diagram illustrating a validation result of the number of anchor information requests when the number of adjacencies of the room is changed.

FIG. 22 and FIG. 23 show results in a case of changing a number N of adjacencies of the room when the number of stored anchors is N+1 (K=N+1) and the waiting time period in each room is two minutes (T=2 minutes). FIG. 22 shows a change in delay time period [second] with respect to the number of adjacencies of the room, and FIG. 23 shows a change in number of anchor information requests with respect to the number of adjacencies of the room. In the technology of the related art, performance does not change even in a case where N is changed. Thus, only a performance value in a case of using the information processing system 1 according to the embodiment is shown.

From the result in FIG. 22, it is perceived that as the number of adjacencies is increased, the delay time period until the start of sharing of the mixed reality space is increased. This is because as the number of adjacencies is increased with respect to the waiting time period in the room, downloading of the anchor information of the adjacent room may not be performed in time for movement between the rooms. In addition, from the result in FIG. 23, it is perceived that as the number of adjacencies is increased, the number of anchor information requests is also increased.

(4) Effect

Even in a case of using the technology of the related art, one mixed reality space can be shared among the plurality of MR terminals 100, and each user can view the same mixed reality space. However, in the technology of the related art, in a case where a plurality of mixed reality spaces of the sharing target are present, a mixed reality space in which the MR terminal 100 is currently positioned cannot be determined on the MR terminal 100 side. Thus, the MR terminal 100 does not know the room into which the MR terminal 100 is to be placed on the server 10, and the mixed reality space cannot be shared.

Thus, in the embodiment, the 3D information of the shape of the corresponding real space is provided in each room managed on the server 10 and is compared with the 3D information acquired by the MR terminal 100. This enables the MR terminal 100 to identify the mixed reality space in which the MR terminal 100 is currently positioned (solution of Objects 1 and 3).

Furthermore, where the position of the MR terminal 100 is present in the 3D information of the MR terminal 100 is periodically verified on the MR terminal 100 side. This enables the MR terminal 100 to recognize whether the position of the MR terminal 100 is present inside or outside the target space of the room in which the MR terminal 100 is placed (solution of Object 2).

A plurality of mixed reality spaces can be shared among the plurality of MR terminals 100 by using the above technology. However, the anchor information that is necessary varies for each room. Thus, in a case where the plurality of mixed reality spaces are simply (by using the same method as the technology of the related art) shared, the anchor information is downloaded from the server 10 each time the room changes, and a significant delay occurs until the start of sharing.

Thus, in the embodiment, the adjacency relationship between the rooms is constructed based on movement of the MR terminal 100, and the anchor information of the adjacent room is downloaded in advance by using information of the adjacency relationship. This can reduce the delay that occurs until sharing of the mixed reality space after the MR terminal 100 moves from the room (solution of Object 4).

In a case of sharing the plurality of mixed reality spaces in a state where Objects 1 to 3 are solved, a method of causing the MR terminal 100 to acquire all pieces of anchor information stored in the server 10 in advance is also considered as a method of simply reducing the delay until the start of sharing of the mixed reality space. However, in an environment of sharing the mixed reality space regardless of indoor or outdoor spaces, it is considered that the number of pieces of anchor information is significantly increased. Thus, causing the MR terminal 100 to acquire all pieces of anchor information in advance is not realistic.

Regarding such an object, in the embodiment, spaces to which the user wearing the MR terminal 100 subsequently moves are narrowed down by constructing the adjacency relationship between the rooms based on information of the room in which the MR terminal 100 generating a certain room has stayed so far. This enables acquisition, before movement, of only the information of the space to which the MR terminal 100 (user wearing the MR terminal 100) may possibly subsequently move. Thus, the delay required for sharing the plurality of mixed reality spaces can be reduced with a smaller communication amount than in a case of acquiring all pieces of anchor information stored in the server 10.

Other Embodiments

The disclosure is not limited to the above-described embodiment. For example, the function units 201 to 211 included in the MR terminal 100 may be distributed among a plurality of apparatuses, and processing may be performed by the apparatuses cooperating with each other. For example, several function units included in the MR terminal 100 can be disposed in the server 10, or several function units can be disposed in a user terminal (not illustrated) such as a smartphone. In addition, each function unit may be implemented by using a circuit. The circuit may be a dedicated circuit implementing a specific function or a general-purpose circuit such as a processor.

Similarly, the function units 21 to 28 included in the server 10 may be distributed among a plurality of apparatuses.

The adjacency relationship setting processing of the adjacency relationship setting unit 27 of the server 10 may use layout information of the building stored in a database, not illustrated, or information that represents a positional relationship input by an operator.

The MR terminal 100 is not limited to a optical transmission type such as HoloLens described above and may be a terminal of a video transmission type that uses a video captured by a camera. In addition, the MR terminal 100 is not limited to a head-mounted display and may be, for example, a handheld display, a wearable computer of another form, a smartphone, or a tablet terminal.

Each time the MR terminal 100 is shut down, the MR terminal 100 may delete the lastly stored anchor information from the storage or maintain the lastly stored anchor information. In a case of starting the MR terminal 100 again in the same chamber after a shutdown, processing of newly acquiring the anchor information from the server 10 after the start can be omitted by maintaining the lastly stored information in the storage.

In addition, the MR terminal 100 may determine exiting from the room by periodically inquiring to the server 10 by transmitting the 3D information, or determine exiting from the room by maintaining the acquired 3D information for a constant time period and estimating the position of the MR terminal 100 by comparing with the 3D information maintained in the MR terminal 100. Alternatively, the MR terminal 100 may detect movement from the chamber as the real space by receiving a signal from a beacon that is installed in each chamber. In this case, each time movement from the chamber is detected, the MR terminal 100 may acquire the 3D information again and transmit the 3D information to the server 10 for room verification.

While the "chamber" is illustratively described as one example of the real space in the embodiment, the real space as a base for constructing the mixed reality space is not limited to the indoor chamber surrounded by, for example, walls. The embodiment can be applied to any space in which the anchor for mapping the virtual object can be arranged, and the real space may be an outdoor space or a partial region of the chamber. In addition, as described above, the embodiment can also be applied for sharing the same virtual information between different real spaces such as classrooms at school.

In addition, the embodiment is not limited to the information processing system 1, the server 10, or the MR terminal 100 described above and can be applied to, for example, other information processing systems, servers, information processing apparatuses, or terminals sharing the anchor information corresponding to the spatial information of the current space.

Besides, the processing of constructing the mixed reality space in the MR terminal 100 can be implemented with various modifications without departing from a gist of the present disclosure.

In sum, the present disclosure is not limited to the embodiment and can be subjected to various modifications without departing from the gist in an implementation phase. An appropriate combination of the embodiments can also be implemented, in which a combination of their effects can be obtained. Further, the above embodiments include various disclosures, which can be designed by combining constituent elements selected from a plurality of constituent elements disclosed here. For example, a configuration in which some constituent elements are removed from all the constituent elements shown in the embodiments can be designed as a disclosure if the problems can be solved and the effects can be achieved.

REFERENCE SIGNS LIST

1 Information processing system
10 Server
11 Communication interface
20: Control unit
20A Hardware processor
20B Program memory
21 Room management unit
22 Room creation unit
23 Terminal state reference unit
24 Terminal state management unit
25 Terminal state update unit
26 Anchor information sharing unit
27 Adjacency relationship setting unit
28 Transmission control unit
30 Data memory
31 Room information storage unit
50 Bus
100 Information processing terminal, MR terminal, client
120 Control unit
120A Hardware processor
120B Program memory
130 Data memory
131 Anchor information storage unit
140 Communication interface
150 Input/output interface
160 Input device
170 Output device
180 Bus
201 Spatial information acquisition unit
202 Room verification unit
203 Room creation request unit
204 Anchor information management unit
205 Anchor information upload (UL) unit
206 Anchor information download (DL) unit
207 Anchor information loading unit
208 Adjacency information request unit
209 Adjacency information storage processing unit
210 Exiting determination unit
211 Output image generation unit

The invention claimed is:

1. An information processing system, comprising:
an information processing terminal configured to acquire spatial information representing a real space and display an image representing a mixed reality space obtained by superimposing a virtual space in the real space; and
a server apparatus configured to communicate with the information processing terminal,
the server apparatus including:
a processor; and
a storage medium having computer program instructions stored thereon, when executed by the processor, perform to:
for each of a plurality of real spaces, create and manage mixed space management information in which (a) information for identifying the real space, (b) anchor information for defining a superimposition position of the virtual space in the real space, and (c) anchor information corresponding to an adjacent real space are associated, and
in a case where an acquisition request for anchor information corresponding to a first real space among the plurality of real spaces is received from the information processing terminal, transmit response information including (a) first anchor information corresponding to the first real space and (b) second anchor information corresponding to a second real space adjacent to the first real space to the information processing terminal of a request source based on mixed space management information corresponding to the first real space, and
the information processing terminal including:
a processor; and
a storage medium having computer program instructions stored thereon, when executed by the processor, perform to:
in a case where the information processing terminal is placed into the first real space among the plurality of real spaces, acquire the response information from the server apparatus by transmitting the acquisition request for the anchor information to the server apparatus,
store the acquired response information in a storage medium and,
in a case where the information processing terminal is placed into the second real space, generate information representing a mixed reality space obtained by superimposing the virtual space in the second real space based on the second anchor information included in the response information stored in the storage medium.

2. The information processing system according to claim 1, wherein
the information for identifying the real space includes the spatial information representing the real space and acquired by the information processing terminal, and
the mixed space management information further includes terminal state information that is estimated based on the spatial information received from the information processing terminal, and that represents a real space in which the information processing terminal is positioned.

3. The information processing system according to claim 2, wherein the computer program instructions of the server apparatus further perform to estimate an adjacency relationship related to the plurality of real spaces based on the terminal state information and spatial information newly received from the information processing terminal, and output an estimation result.

4. A server apparatus, comprising:
a processor configured to communicate with an information processing terminal configured to acquire spatial information representing a real space and display an image representing a mixed reality space obtained by superimposing a virtual space in the real space; and
a memory connected to the processor,
the memory including a storage unit configured to, for each of a plurality of real spaces, store mixed space management information in which (a) information for identifying the real space, (b) anchor information for defining a superimposition position of the virtual space in the real space, and (c) anchor information corresponding to an adjacent real space are associated, and
the processor being configured to, in a case where an acquisition request for anchor information corresponding to a first real space among the plurality of real spaces is received from the information processing terminal, transmit response information including (a) first anchor information corresponding to the first real space and (b) second anchor information corresponding to a second real space adjacent to the first real space to the information processing terminal of a request source based on mixed space management information corresponding to the first real space.

5. A non-transitory computer-readable medium having computer-executable instructions that, upon execution of the instructions by a processor of a computer, cause the computer to function as the server apparatus according to claim 4.

6. The sever apparatus according to claim 4, wherein
the information for identifying the real space includes the spatial information representing the real space and acquired by the information processing terminal, and
the mixed space management information further includes terminal state information that is estimated based on the spatial information received from the information processing terminal, and that represents a real space in which the information processing terminal is positioned.

7. The server apparatus according to claim 6, wherein the processor is further configured to estimate an adjacency relationship related to the plurality of real spaces based on the terminal state information and spatial information newly received from the information processing terminal, and output an estimation result.

8. An information processing method comprising, at an information processing system including an information processing terminal configured to acquire spatial information representing a real space and display an image representing a mixed reality space obtained by superimposing a virtual space in the real space, and a server apparatus configured to communicate with the information processing terminal:
at the server apparatus, for each of a plurality of real spaces, creating and managing mixed space management information in which (a) information for identifying the real space, (b) anchor information for defining a superimposition position of the virtual space in the real space, and (c) anchor information corresponding to an adjacent real space are associated,
at the server apparatus, in a case where an acquisition request for anchor information corresponding to a first real space among the plurality of real spaces is received from the information processing terminal, transmitting response information including (a) first anchor information corresponding to the first real space and (b) second anchor information corresponding to a second real space adjacent to the first real space to the information processing terminal of a request source based on mixed space management information corresponding to the first real space,
at the information processing terminal, in a case where the information processing terminal is placed into the first real space among the plurality of real spaces, acquiring the response information from the server apparatus by transmitting the acquisition request for the anchor information to the server apparatus, and
at the information processing terminal:
storing the acquired response information in a storage medium; and,
in a case where the information processing terminal is placed into the second real space, generating information representing a mixed reality space obtained by superimposing the virtual space in the second real space based on the second anchor information included in the response information stored in the storage medium.

9. The information processing method according to claim 8, wherein
the information for identifying the real space includes the spatial information representing the real space and acquired by the information processing terminal, and
the mixed space management information further includes terminal state information that is estimated based on the spatial information received from the information processing terminal, and that represents a real space in which the information processing terminal is positioned.

10. The information processing method according to claim 9, further comprising estimating an adjacency relationship related to the plurality of real spaces based on the terminal state information and spatial information newly received from the information processing terminal, and outputting an estimation result.

* * * * *